(12) United States Patent
Sreenivasan et al.

(10) Patent No.: US 11,816,429 B2
(45) Date of Patent: Nov. 14, 2023

(54) DOCUMENT TEMPLATE RECOMMENDATION SYSTEM FOR COLLABORATIVE DOCUMENT MANAGEMENT SYSTEM

(71) Applicants: Atlassian Pty Ltd., Sydney (AU); Atlassian Inc., San Francisco, CA (US)

(72) Inventors: Sridhar Sreenivasan, Redwood City, CA (US); Eungchan Kim, Mountain View, CA (US); Dilani Kahawala, San Carlos, CA (US); Balazs Nagy, Mountain View, CA (US)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 162 days.

(21) Appl. No.: 17/358,520

(22) Filed: Jun. 25, 2021

(65) Prior Publication Data
US 2022/0414323 A1 Dec. 29, 2022

(51) Int. Cl.
*G06F 40/186* (2020.01)
*G06F 3/0482* (2013.01)
*G06F 9/451* (2018.01)

(52) U.S. Cl.
CPC .......... *G06F 40/186* (2020.01); *G06F 3/0482* (2013.01); *G06F 9/451* (2018.02)

(58) Field of Classification Search
CPC ....... G06F 40/186; G06F 3/0482; G06F 9/451
See application file for complete search history.

(56) References Cited

U.S. PATENT DOCUMENTS

| | | | | |
|---|---|---|---|---|
| 9,405,494 | B2* | 8/2016 | Tomioka | G06F 3/1208 |
| 10,242,069 | B2* | 3/2019 | Mowatt | G06F 16/24578 |
| 10,963,475 | B2* | 3/2021 | Chakra | G06F 16/26 |
| 11,061,725 | B2* | 7/2021 | Pisters | G06F 11/0766 |
| 2013/0159066 | A1* | 6/2013 | Welch | G06T 13/80 |
| | | | | 345/473 |
| 2013/0332291 | A1* | 12/2013 | Perez | G06Q 30/0623 |
| | | | | 705/14.73 |
| 2015/0254597 | A1* | 9/2015 | Jahagirdar | G06Q 10/063118 |
| | | | | 705/7.15 |

(Continued)

*Primary Examiner* — Alvin H Tan
(74) *Attorney, Agent, or Firm* — Brownstein Hyatt Farber Schreck, LLP

(57) ABSTRACT

A method includes, receiving, from a client application operating on a client device, a document creation request associated with an active workspace of a plurality of workspaces of a collaborative document system. The method further includes, responsive to receiving the document creation request, obtaining, for the active workspace, a respective document-creation history for each of a plurality of document templates associated with the active workspace, computing, based at least in part on the respective document-creation histories, a respective relevance weight for each of the plurality of document templates associated with the active workspace, causing identifiers of at least a subset of the plurality of document templates to be displayed to the user in accordance with a rank order, the rank order based at least in part on the computed relevance weights for the plurality of document templates, and causing a document template associated with a selected identifier to be displayed.

19 Claims, 15 Drawing Sheets

(56) References Cited

U.S. PATENT DOCUMENTS

2016/0125527 A1* 5/2016 Marinova ............ G06Q 10/101
  705/36 R
2017/0213272 A1* 7/2017 Mowatt .............. G06Q 30/0204
2022/0405852 A1* 12/2022 Fohr .................. G06Q 20/3821

* cited by examiner

Document Creation Histories - Marketing — 600

602 → Template | 604 → Count
- Sales Target 1 Pager — 140
- Blog Post — 92
- Meeting notes — 30
- Quarterly Marketing Report — 1

FIG. 6A

Document Creation Histories - Engineering — 610

612 → Template | 614 → Count
- Engineering Status Report — 27
- Project timeline — 14
- Blog Post — 11
- Meeting notes — 6

FIG. 6B

DOCUMENT TEMPLATE RECOMMENDATION SYSTEM FOR COLLABORATIVE DOCUMENT MANAGEMENT SYSTEM

TECHNICAL FIELD

The present disclosure is generally directed to collaborative document management and communication systems and, more specifically, to systems and methods for suggesting or recommending document templates to users based on document-creation histories.

BACKGROUND

Modern electronic devices facilitate a myriad of uses, both for business and personal endeavors. For example, electronic devices like personal computers, tablets, mobile phones, are used in both business and personal contexts for creating and storing documents, writing computer code, communicating with other individuals (e.g., via email, chat services, voice and video calls, etc.), and the like. Collaborative computer-based systems, such as shared document systems, may be used by organizations to allow users to create, store, and access files and other content items. Due to the vast numbers and types of content items that may be created and stored in such systems, as well as the vast number of people who may access and use such systems, it may be cumbersome to create new documents and to maintain consistency in document styles and appearance across an organization.

SUMMARY

A method includes, in a collaborative document system comprising a plurality of user-generated documents, each user-generated document associated with a workspace of a plurality of workspaces of the collaborative document system, receiving, from a client application operating on a client device, a document creation request associated with an active workspace of the plurality of workspaces of the collaborative document system. The method further includes, responsive to receiving the document creation request, obtaining, for the active workspace, a respective document-creation history for each of a plurality of document templates associated with the active workspace, wherein each respective document-creation history corresponds to a number of times a respective document template has been used to create a new document in the active workspace, computing, based at least in part on the respective document-creation histories, a respective relevance weight for each of the plurality of document templates associated with the active workspace, and causing identifiers of at least a subset of the plurality of document templates to be displayed to the user in accordance with a rank order, the rank order based at least in part on the computed relevance weights for the plurality of document templates. The method further includes detecting a user selection of an identifier of the displayed identifiers, and in response to detecting the user selection of the identifier, causing a document template associated with the selected identifier to be displayed to the user.

A respective relevance weight may represent a number of times a respective document template has been used to create a new document within a predetermined time window. The document creation request may be a first document creation request, the active workspace may be a first workspace, the document-creation histories may be first document-creation histories, the rank order may be a first rank order, the plurality of document templates may be a first plurality of document templates, and the method may further include detecting, from the user, a second document creation request originating from a second workspace of the collaborative document system, the second workspace different from the first workspace. The method may further include, responsive to detecting the second document creation request, obtaining, for the second workspace, a respective second document-creation history for each of a second plurality of document templates associated with the second workspace, wherein each respective second document-creation history corresponds to a number of times a respective document template has been used to create a new document in the second workspace, computing, based at least in part on the respective second document-creation histories, a respective relevance weight for each of the second plurality of document templates associated with the second workspace, and causing identifiers of at least a subset of the second plurality of document templates to be displayed to the user in accordance with a second rank order, the second rank order based at least in part on the computed relevance weights for the second plurality of document templates.

The first plurality of document templates may include a first group of document templates that are available in two or more workspaces of the plurality of workspaces and a second group of document templates that are available only in the first workspace, and the second plurality of document templates may include the first group of document templates and a third group of documents that are available only in the second workspace.

The subset of the plurality of document templates may be a first subset of the plurality of document templates, and the method may further include causing identifiers of a second subset of the plurality of document templates to be displayed to the user in alphabetical order and below the first subset of the plurality of document templates.

A method may include, in a collaborative document system comprising a plurality of user-generated documents, the user-generated documents associated with workspaces of the collaborative document system, determining, for a first workspace of the collaborative document system, respective document-creation histories for each of a first plurality of document templates associated with the first workspace, and determining, for a second workspace of the collaborative document system, respective document-creation histories for each of a second plurality of document templates associated with the second workspace, the second plurality of document templates different from the first plurality of document templates. The method may further include detecting, from a user, a first document creation request originating from the first workspace, responsive to detecting the first document creation request, causing identifiers of at least a subset of the first plurality of document templates to be displayed to the user in accordance with a first rank order, the first rank order based at least in part on the respective document-creation histories for the first plurality of document templates, detecting, from the user, a second document creation request originating from the second workspace, and responsive to detecting the second document creation request, causing identifiers of at least a subset of the second plurality of document templates to be displayed to the user in accordance with a second rank order, the second rank order based at least in part on the respective document-creation histories for the second plurality of document templates.

The collaborative document system may include a plurality of workspaces, each workspace associated with a different set of user-generated documents organized in a different organizational hierarchy. The method may further include receiving, from the user, a definition for a first user-generated document template for use in the first workspace, and including the first user-generated document template in the first plurality of document templates and not in the second plurality of document templates. The method may further include receiving, from the user, a definition for a second user-generated document template for use in the second workspace, and including the second user-generated document template in the second plurality of document templates and not in the first plurality of document templates.

A method may include, at a client device of a collaborative document system, the collaborative document system comprising a plurality of user-generated documents associated with workspaces of the collaborative document system, displaying a graphical user interface on a display, displaying, in a first region of the graphical user interface, a plurality of workspace identifiers, each respective workspace identifier corresponding to a respective workspace that is associated with a respective set of user-generated documents, receiving a selection of a workspace identifier from the plurality of workspace identifiers, the workspace identifier associated with a workspace within the collaborative document system, in response to receiving the selection of the workspace identifier, displaying, in the first region, a plurality of document links, each respective document link corresponding to a respective user-generated document associated with the workspace, and detecting, from a user, a document creation request originating from the workspace. The method may further include, responsive to detecting the document creation request, obtaining, for the workspace, respective document-creation histories for each of a plurality of document templates associated with the workspace, wherein each respective document-creation history corresponds to a number of times a respective document template has been used to create a new document in the workspace, and displaying, in a second region of the graphical user interface, identifiers of at least a subset of the plurality of document templates in accordance with a rank order, the rank order based at least in part on the respective document-creation histories for the plurality of document templates. The method may further include detecting a user selection of an identifier of the displayed identifiers, and in response to detecting the user selection of the identifier, causing a document template associated with the selected identifier to be displayed in a third region of the graphical user interface.

The method may further include receiving user-generated content in the document template, receiving a document generation request, and, in response to receiving the document generation request, incorporating the user-generated content into a document based on the document template, and storing the document in association with the selected workspace.

The document template may include a plurality of predefined text input fields, and the user-generated content may include text input into the predefined text input fields. The rank order may be further based on an amount of unique users who have generated documents using each of the plurality of document templates.

The method may further include determining an average usage metric of the plurality of document templates, determining a usage metric of a particular document template of the plurality of document templates, and, in accordance with a determination that a difference between the usage metric of the particular document template and the average usage metric of the plurality of document templates satisfies a criteria, including the particular document template in the subset of the plurality of document templates. The usage metric may be a usage frequency, and the criteria may include a statistical significance condition.

A method may include, in a collaborative document system comprising a plurality of user-generated documents, the user-generated documents associated with workspaces of the collaborative document system, detecting, from a user, a document creation request originating from a workspace of the collaborative document system, responsive to detecting the document creation request, obtaining, for the workspace, respective document-creation histories for each of a plurality of document templates associated with the workspace, wherein each respective document-creation history corresponds to a number of times a respective document template has been used to create a new document in the workspace, determining, using the respective document-creation histories, whether a usage attribute of the plurality of document templates satisfies a usage condition, responsive to the usage attribute failing to satisfy the usage condition, causing a first set of identifiers corresponding to a first subset of the plurality of document templates to be displayed the user, and responsive to the usage attribute satisfying the usage condition, causing a second set of identifiers corresponding to a second subset of the plurality of document templates to be displayed the user, the second subset different from the first subset.

The usage attribute may satisfy the usage condition if an amount of documents in the workspace is greater than a threshold amount. The usage attribute may satisfy the usage condition if an amount of documents in the workspace is greater than a first threshold amount, and an amount of unique users who have generated documents in the workspace is greater than a second threshold amount.

A method may include, in a collaborative document system comprising a plurality of user-generated documents, the user-generated documents associated with workspaces of the collaborative document system, detecting, from a user, a first document creation request originating from a workspace of the collaborative document system, responsive to detecting the first document creation request, identifying a first plurality of document templates associated with the workspace, wherein the first plurality of document templates only includes document templates that are shared among multiple workspaces of the collaborative document system, and causing identifiers of at least a subset of the first plurality of document templates to be displayed to the user. The method may further include, after detecting the first document creation request, detecting, from the user, a second document creation request originating from the workspace of the collaborative document system, and responsive to detecting the second document creation request, identifying a second plurality of document templates associated with the workspace. The second plurality of document templates may include the first plurality of document templates and a local document template that is accessible only within the workspace of the collaborative document system. The method may further include causing identifiers of at least a subset of the second plurality of document templates to be displayed to the user. The local document template may have been added to the collaborative document system after the first document creation request was detected.

BRIEF DESCRIPTION OF THE DRAWINGS

In the drawings:

FIGS. 6A-6B depict example data structures of document-creation histories of workspaces in the collaborative document system.

Figure 1A:
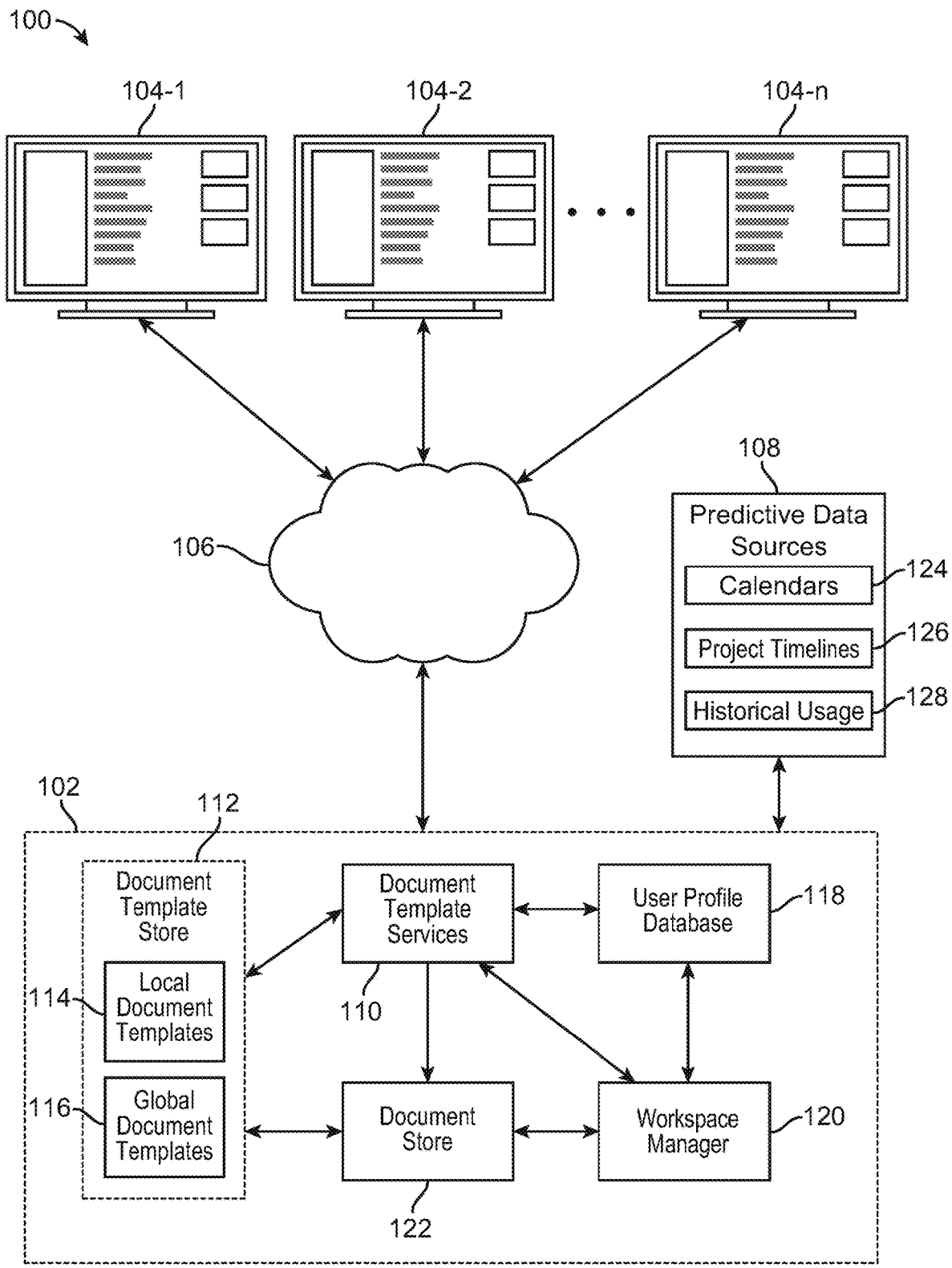
FIG. 1A depicts an example collaborative document system in which various features of the present disclosure may be implemented.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION OF THE EMBODIMENTS

In the following description numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

The present disclosure is generally directed to systems and methods for providing intelligent document-template recommendations to users of a collaborative document system. In particular, a collaborative document system (CDS) may allow users to generate, store, and access many different types of documents. These may include, for example, marketing reports, financial reports, blog posts, frequently-asked-question documents, engineering timelines, white papers, checklists, and so forth. In order to improve the efficiency and convenience of the CDS, document templates may be provided to assist users in generating documents. Document templates may provide pre-established formatting, predefined text input fields, graphics, layouts, sample text, instructions, or the like. Document templates may help users generate documents faster and more efficiently and may help ensure uniformity and consistency of documents across a department or organization.

A CDS may be organized into a hierarchy of workspaces, with each workspace associated with a department, division, group, subject area, or other category that is useful to the organization using the CDS. Thus, as one example, a company may have a workspace for a marketing department, a workspace for an engineering department, and a workspace for a finance department. Because the CDS can serve multiple different groups (e.g., via workspaces), there may be myriad different types of documents that are generated and stored in the CDS. By storing documents in particular workspaces, users can easily find documents that are relevant to a particular subject or department, while avoiding documents that are not. Document templates, however, may not fit as neatly into the same hierarchy. For example, some document templates may be used across multiple workspaces, while others may be unique to specific workspaces. For example, both an engineering department and a marketing department may create documents using "blog post" and "meeting notes" document templates, while an engineering timeline may be used only by an engineering department and wholly irrelevant to a marketing and finance department. Accordingly, it may be inefficient and cumbersome to provide all possible templates within all workspaces, as users may be confronted with irrelevant document templates, making it difficult to locate and select a desired document template. It may also be inefficient for each workspace to have its own separate set of document templates, as it may require storing duplicate document templates and it may result in inconsistent document templates (e.g., as templates that should remain uniform be modified differently in different workspaces).

Accordingly, the instant application describes techniques for providing workspace-specific document template recommendations to users of the CDS. These document template recommendations are specific to the particular mix of document templates that are associated with a workspace (e.g., the particular mix of workspace-specific templates and shared templates that are relevant to that workspace), and are also specific to the historical document-creation trends within a workspace. In some cases, the CDS may also predict what document templates may be relevant within a given workspace using predictive data sources. For example, the CDS may identify document templates that are repeatedly used at certain times of the year in a given workspace (e.g., a quarterly financial report in a financial workspace), and promote or recommend those document templates at the appropriate time. Thus, the CDS provides relevant workplace-specific recommendations, while avoiding cluttering the document template options with document templates that are either completely irrelevant to that particular workspace (e.g., an engineering timeline in a marketing workspace) or that are generally less popular in that workspace.

As noted above, document templates may be specific to one workspace, while other document templates are shared among multiple workspaces or among all workspaces. Thus, document templates may be characterized at least in part by their position in the organizational hierarchy of the CDS (which may be defined by the workspaces). Document templates may also be characterized as system-supplied document templates or user-generated document templates. In particular, in order to improve the experience of using the CDS, a set of system-supplied document templates may be provided with the CDS. These document templates may help users begin to generate document and become familiar with the use of document templates in the CDS. System-supplied document templates may be shared among all of the workspaces by default. Users of the CDS may then begin to create new document templates. Such user-created document templates may be created within a specific workspace for use only in that workspace, or they may be created for use across multiple workspaces. Accordingly, the set of document templates in the CDS will evolve over time, with each individual workspace having a different mix of system-supplied document templates, user-generated document templates, shared or workspace-independent document templates (also referred to as global document templates), and workspace-specific document templates (also referred to as local document templates).

As the mix of document templates evolves in a given workspace, the manner in which document templates are recommended to users reflects and accounts for the way in which workspaces are being used (e.g., what types of documents are being generated in that workspace), as well as the particular mix of document templates that is associated with a given workspace. For example, when the CDS is first commissioned, the system may provide document templates to users in an alphabetical order. As users begin to generate documents using the document templates, the system may promote or recommend document templates that are more frequently used to generate documents in a given workspace. Further, as users or administrators begin to add and use local document templates in workspaces, the system may promote or recommend the local document templates based on their usage. This process provides relevant and useful document template recommendations at all phases of use of the CDS, from when it is first commissioned to when it is fully mature.

FIG. 1 depicts an example collaborative document system 100 (or simply "system 100") in which the techniques described herein may be employed. The system 100 includes a document services system 102, predictive data sources 108, and client devices 104 (104-1, . . . , 104-n) that communicate via a network 106 (e.g., the Internet). The client devices 104 may be any suitable type of device, including but not limited to a desktop or laptop computer, tablet computer, mobile phone, personal digital assistant, smart device, voice-based digital assistant, or the like.

The document services system 102 may be or may include one or more servers, content stores (e.g., databases), communications systems, data structures, programs, or other components, systems, or subsystems that provide document creation and storage services, document template creation and storage services, user profile and workspace management services, and/or other services described herein. For example, the document services system 102 may include and/or provide document templates services 110, a document template store 112, a user profile database 118, a workspace manager 120, and a document store 122. These components may execute over one or more computing resources of the document services system 102, and may share resources such as storage media, processors, memory, and the like. In some cases, they may be instantiated as separate computer systems (e.g., servers, databases, etc.) that communicate with one another to provide the functionality of the document services system 102.

The document store 122 may store documents related to an organization that is using or otherwise associated with the collaborative document system 100. The document store 122 may include documents of numerous types, including but not limited to text documents, spreadsheets, reports, production timelines, presentations, data files, content pages (e.g., web pages, personalized landing pages), blogs, comment forums (including comments and/or other comment data), data objects, computer code (e.g., source code files, compiled code and/or applications, libraries, etc.), emails, media content (e.g., images, videos, etc.), and the like. The documents in the document store 122 may be stored in association with a workspace of the CDS 100. For example, each document may be assigned to a workspace, and may be visible and/or accessible only in that workspace. By default, documents may be stored in association with a workspace that was active on a client when the document was created. For example, when a user is interacting with the CDS 100, the user can select one of the available workspaces in which to operate. The selected workspace may define what documents, actions, templates, or services are available while that workspace is selected. Thus, if a user has selected a given workspace (also referred to as the user being "in" that workspace), the user may be able to view, search, modify, or otherwise interact with other documents, document templates, or other content that is stored in association with that workspace. Similarly, if a user initiates a document creation request while in a given workspace, the document that is generated will be stored in the given workspace. As yet another example, a user may initiate a document creation request without being in any particular workspace, and then specify (e.g., as part of or during a document creation process) what workspace the document is to be associated with. As used herein, when a user selects a workspace, the workspace that has been selected may be referred to as an active workspace, selected workspace, current workspace, or the like. As noted above, the selection of a workspace may define what documents, actions, templates, or services are available to the user when interacting with the CDS 100 (e.g., via a client device).

The workspace manager 120 may provide services related to the workspaces in a given instantiation of the CDS 100. For example, the workspace manager 120 may store information about the workspaces for the CDS 100, including workspace names, workspace attributes, content access and editing privileges, authorized user lists, document associations, document template associations, and the like. Entities using the CDS 100 may define an arbitrary number and organization of workspaces. In some cases, workspaces may relate to departments or divisions of an organization, such as a marketing workspace (associated with a marketing department), a finance workspace (associated with a finance department), and an engineering workspace (associated with an engineering department). In some cases, workspaces relate to subjects that are relevant to an entity using the CDS. For example, an engineering firm may have workspaces related to each of its pending projects, workspaces related to its vendors, or the like. Workspaces may be defined by or include hierarchical organizational structures, and may include nested sub-workspaces, folders, or other logical divisions, each of which may be associated with different documents and users. The workspace manager, optionally in conjunction with the document store 122, document template store 112, and user profile database 118, may store information relating workspaces to documents, document templates, and users. For example, the workspace manager 120 may maintain a list of users associated with each workspace and the users' respective permissions, authorizations, etc., for each workspace. The workspace manager 120 may also maintain a list of documents that are stored in association with each workspace, along with which users may edit, view, modify, or otherwise interact with those documents. The workspace manager 120 may also maintain a list of document templates that are accessible within each workspace. In some cases, the associations of workspaces to users, documents, and document templates may be stored or otherwise managed by the user profile database 118, document store 122, and document template store 112 (either instead of the workspace manager 120 or in conjunction with the workspace manager 120).

The user profile database 118 may store and maintain user profiles about users of the CDS 100. User profiles may include numerous types of information (also referred to as attributes) about the users of the system, including but not limited to names, departments, job titles, roles, teams with which they are associated, projects with which they are associated, supervisors, subordinates, team members, technical or occupational expertise, and relative position in a hierarchy in an organization or entity. The user profile database 118 may communicate with or otherwise operate in conjunction with the workspace manager 120, document store 122, document templates services 110, and/or other modules or services, to define and maintain associations between users and documents, document templates, workspaces, or the like.

The document template store 112 stores document templates for use in the CDS 100, including local document templates 114 (e.g., workspace-specific document templates) and global document templates 116 (e.g., workspace-independent document templates). As described herein, local document templates 114 include document templates that are available in less than all of the workspaces in the CDS 100. In some cases, local document templates 114 may be available in only a single workspace (e.g., at least one workspace), or in multiple workspaces, but not in all of the workspaces. Accordingly, local document templates 114 may be considered workspace-specific document templates. Global document templates 116 include document templates that are generally available in all of the workspaces (and at minimum are available in no less than two workspaces). Accordingly, global document templates may be considered workspace-independent document templates. In some cases, the definitions of local document templates 114 include or are associated with workspace limits (e.g., identifiers of which workspace or workspaces that template is available in), whereas the definitions of global document templates 116 do not include or allow workspace limits. One example local document template may be a financial report template being limited to a finance department workspace, while an example global document template may be a meeting notes template being available in all workspaces.

As described herein, a set of global document templates may be provided with the CDS to help users create new documents when the CDS system is being used for the first time, and before the users begin to generate more customized, local document templates. In some cases, global document templates may be hidden or removed from workspaces by users of the CDS, or automatically. For example, it may become apparent to a user that a particular global document template is irrelevant to a particular workspace. Accordingly, a user may cause that particular global template to be hidden or otherwise disassociated with that particular workspace. In such cases, the hidden or disassociated document template may still be considered a global template. In some cases, information identifying which global document templates are hidden or stored in association with the definition of a given workspace (e.g., by the workspace manager), rather than in association with the global templates. By contrast, in some cases, the associations between local templates may be stored in association with the template definition, rather than a workspace definition. In some cases, the associations between templates, including either or both of local and global templates, are stored and/or managed by the document template services 110.

The document template services 110 may provide services related to the access and use of document templates by client devices and/or users of the CDS 100. For example, the document template services 110 may detect document creation requests from users, provide document template lists to users, detect user selections of particular templates, facilitate the provision of the selected templates, and store documents that are generated using document templates (e.g., in the document store 122). The document template services 110 may also record, track, manage, and analyze document-creation histories associated with document templates in each workspace, which can be used to generate document template recommendations that are tailored for each individual workspace. In particular, the document template services 110 may determine document template recommendations for individual workspaces based at least in part on document template usage histories within the individual workspaces. For example, as described herein, the document template services 110 may compute, for a given workspace, a respective relevance weight for each of the plurality of document templates associated with the given workspace. Relevance weights may be based at least in part on document-creation histories for each of a plurality of document templates associated with the given workspace. Thus, for example, document templates that have been more frequently used to generate documents in a given workspace will have a higher relevance weight than document templates that have been less frequently used. In this way, the document template services 110 may recommend the most frequently used (e.g., the most relevant) document templates to users of a given workspace. And because the recommendations are workspace-specific, rather than based on document-creation histories across the entire CDS 100, the recommendations are more relevant and useful to the users and are responsive to the particular document creation trends and patterns within individual workspaces.

The document template services 110 may also compute document template recommendations based on predictive data sources 108. The predictive data sources 108 include data sources that may be used to predict what document templates may be useful to individual workspaces and/or individual users of the CDS 100 and recommend those document templates when appropriate. For example, the predictive data sources 108 may include calendars 124, project timelines 126, historical usage 128, and the like. Calendars 124 may include calendars associated with individual users, an organization, workspaces, projects, or the like. Project timelines 126 may include timelines for projects, including milestones, production targets, or the like. Historical usage 128 may include usage data such as document-creation histories and/or patterns that have been identified using document-creation histories. Other types of data sources that may be included in and/or stored by the predictive data sources 108 include search query histories (e.g., user searches for document templates) and data from the content of the document templates themselves (e.g., text from titles or other content of a document template that may indicate a relevant time associated with the document template, such as the word "quarterly" or "yearly" in a title).

The document template services 110 may analyze historical document creation data (which may be stored in or otherwise associated with the predictive data sources 108) to identify patterns of document creation for a given workspace. As a specific example, the document template services 110 may determine that there is a historical pattern of a "sales projection" document template being used to generate documents in a marketing department workspace at or near a particular date (e.g., around January 1). This historical pattern may correspond to a marketing department requiring employees to submit sales projections at the beginning of each year. The document template services 110 may detect this pattern by analyzing data in the predictive data sources 108, and then recommending the "sales projection" document templates at the appropriate time (e.g., around January 1). The document template services 110 may analyze the data in the predictive data sources 108 using pattern recognition techniques such as classification algorithms, clustering algorithms, ensemble learning algorithms, regression algorithms, probabilistic classifiers, etc.

The document template services 110 may also analyze or otherwise use upcoming or planned events to predict which document templates may be useful to users in a workspace. For example, the document template services 110 may analyze data from calendars, project timelines, historical data or the like (e.g., data sources in the predictive data sources 108), in order to identify potentially relevant document templates for a particular time. In the case of calendars, the document template services 110 may identify upcoming calendar entries (or to-do lists, task lists, etc., which may also be part of the predictive data sources 108) that may be associated with document creation events, and determine potentially relevant document templates based on the events. As one example, the document template services 110 may identify a calendar event relating to a due date or deadline, and provide a document template recommendation that is relevant to that due date or deadline (e.g., a sales report document template for a sales report due date or deadline). In the case of project timelines, the document template services 110 may identify upcoming due dates, milestones, phase completion deadlines, or the like, and determine potentially relevant document templates based thereon. In the case of calendars, project timelines, etc., the particular document templates that are recommended may be based on information associated with the particular event, due date, or the like. Such information may include, without limitation, titles, notes, descriptions, metadata, or other information associated with the event, deadline, due date, milestone, etc.

In some cases, the document template services 110 may also use text from the document templates themselves to predict when a document template may be relevant and recommend that document template at that time. For example, the document template services 110 may predict that a "quarterly report" may be relevant for the week before the end of each financial quarter and recommend the "quarterly report" to users at the appropriate time. The document template services 110 may use multiple data sources to predict what document templates may be relevant at what times (e.g., a calendar indicating when a meeting was scheduled to occur, and text from a document template title that includes the words "meeting notes").

Figure 1B:
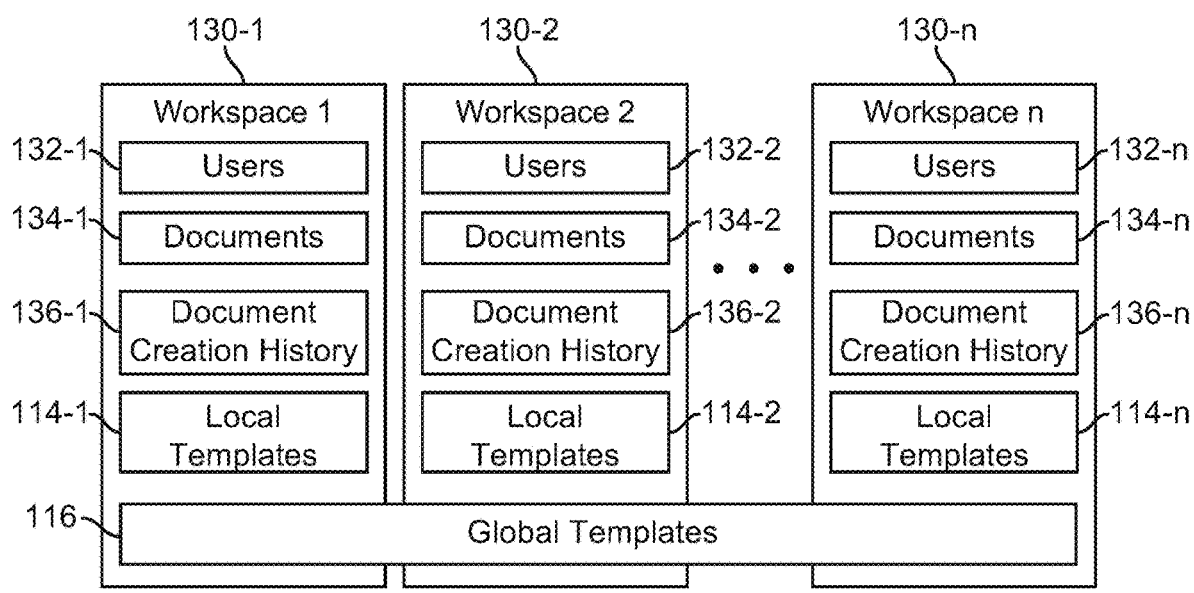
FIG. 1B depicts example data structures used in a collaborative document system.

FIG. 1B illustrates example data structures or definitions of workspaces 130 (e.g., 130-1, . . . , 130-*n*) that may be associated with a CDS 100. As noted above, workspaces 130 may be arbitrarily defined for each instantiation of a CDS 100 and may be defined based on the particular needs of the organization or entity using the CDS 100.

Each workspace 130 may be associated with a unique set of users 132, a unique set of documents 134, a unique document-creation history 136, and a unique set of local document templates 114. The workspaces 130 shown in FIG. 1B should be understood as logical constructs, and not necessarily as separate databases or data stores. For example, the documents 134-1 of workspace 130-1 and the documents 134-2 of workspace 130-2 may both be stored in the same data store (e.g., document store 122), though they are logically associated with their respective workspace (and therefore may be accessible or available only in their respective workspace). In some cases, however, workspaces 130 may be associated with separate data stores, databases, or the like.

The users 132 may be a list of users who are authorized to access the workspace, along with associated permissions, authorizations, rights, etc. A user may be identified as an "administrator" or otherwise given greater rights and/or permissions with respect to a workspace. In some cases, some users may create and/or use local document templates for use in a workspace with which they are associated, while other users can use document templates, but do not have authorization or permission to create (or modify) document templates. The users who are associated with a workspace (e.g., who are permitted to view and/or generate documents in the workspace) may be managed by the workspace manager 120 (or any other suitable services of the CDS 100).

The workspaces 130 may also each include (or otherwise be associated with) a set of documents 134. The documents 134 may be generated by the users of the workspace with which the documents are associated. Thus, if a document is generated in the workspace 130-1, that document is stored in association with the workspace 130-1 (and may be accessible or available only from within that workspace 130-1 and only by users associated with that workspace 130-1 and having sufficient permissions to access that document).

The workspaces 130 may also store document-creation histories 136. Document-creation histories 136 may include information related to the generation of the documents in the workspace, such as a time and date of document creation, a document template used to generate the document, the user who generated the document, the workspace in which the document was generated, etc. The document-creation histories 136 are specific to each workspace (e.g., the document-creation histories 136 are different for each workspace) and may be used to determine what document templates to recommend and/or promote to users of a workspace. For example, document-creation histories 136 may be used to determine the number of times that document templates are used to generate new documents in the workspace. Based on this information, relevance weights can be determined for each document template in a workspace, and the document templates can be displayed to a user in a rank order based on the relevance weights. Thus, for example, the document templates that are used most frequently may be given higher relevance weights, and may be displayed or recommended to a user in accordance with their relevance weight (e.g., with the document templates with the highest relevance weights being listed first, or separately recommended to a user, as shown and described herein). In some cases, the relevance weights represent a number of times that document templates have been used to create a new document within a particular time window (e.g., the previous 1 week, 1 month, 3 months, etc.). In this way, document template recommendations and/or rankings may be dynamic and responsive to the real-time usage patterns of the system. For example, document templates that were once popular but whose frequency of use has declined over time will have a correspondingly declining relevance weight.

As described above, the workspaces 130 are also each associated with a unique set of local document templates 114

(e.g., workspace-specific document templates). The local document templates 114 of a workspace may be created by users who are also associated with the same workspace, and who have sufficient privileges to create and publish document templates. To create a local document template, a user may create a definition for the document template. A definition of a document template may include information defining any aspect of the document template, including document and/or text formatting, document layout, predefined text input fields (including size, locations, titles, prepopulated text, etc.), graphics, sample text, instructions, or the like. Once the document template definition has been created by the user, the document template may be included as one of the local document templates 114 for the workspace in which the document template was provided. (If the user has sufficient permissions and if selected by the user, the document template may be included as a global document template.) The particular set of local document templates 114 in a given workspace may evolve over time, as local document templates are created and removed by users of the workspace.

The workspaces 130 area also associated with global document templates 116 (e.g., workspace-independent document templates). The global document templates 116 are generally accessible in any and all workspaces 130. Global document templates may be provided with the CDS 100, as described above, or they may be created by an authorized user of the CDS 100 (e.g., a system administrator). Upon creation, a global document template may become available to all workspaces by default. Further, upon creation of a new workspace, the global document templates 116 will be available to that workspace by default.

While document-creation histories 136 are specific to individual workspaces, the document-creation histories track the usage of both local and global document templates in each workspace. Thus, the relevance weighting and resulting document template recommendations in a given workspace can relate to both global and local document templates. Accordingly, document templates may be recommended or promoted in a given workspace regardless of whether a they are local or global templates. This helps ensure that the recommendations and/or ranking of document templates in a workspace are based on the actual usage of the document templates, regardless of the origin or type of template.

Figure 2A:
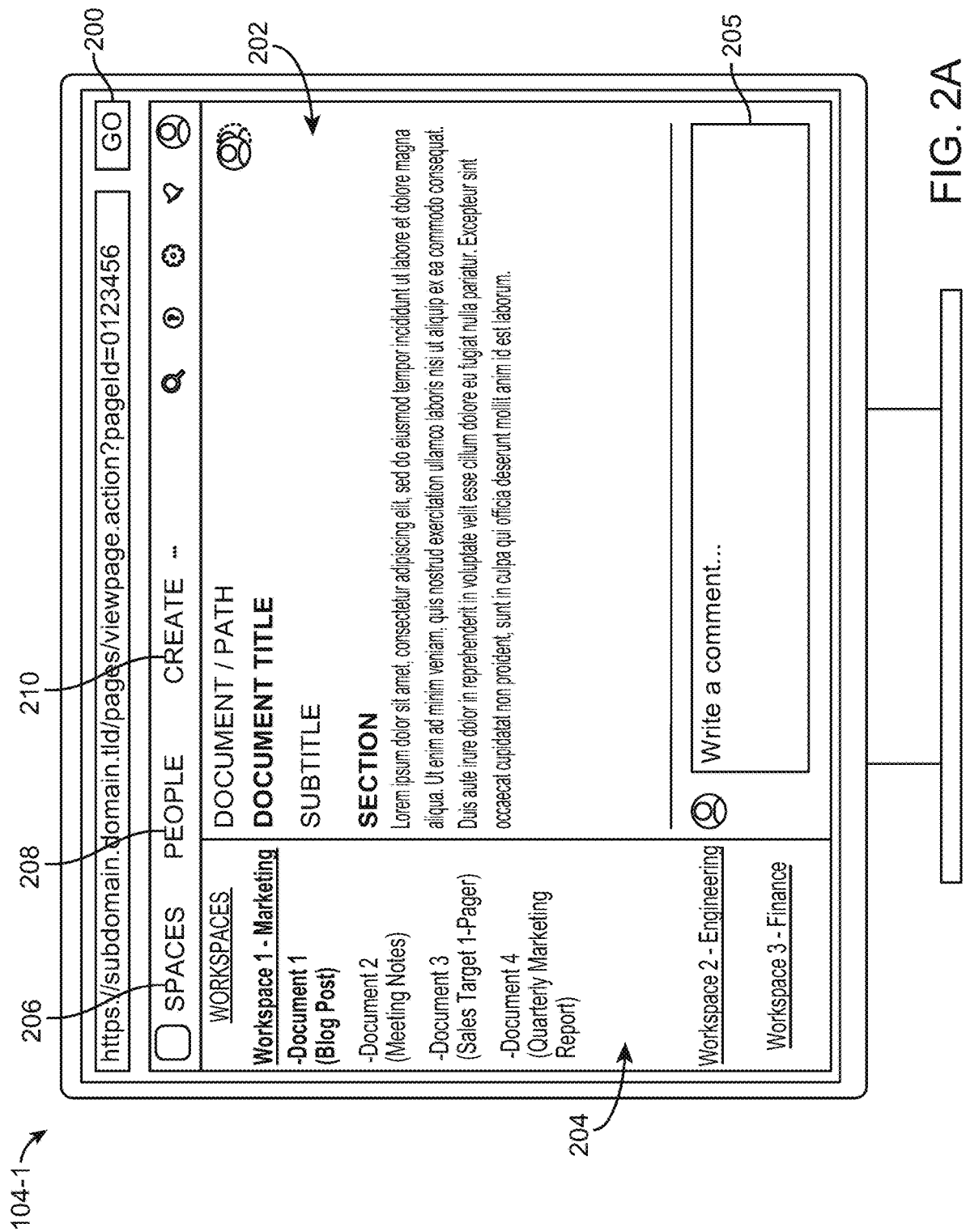
FIGS. 2A-2B depict an example client device and user interface of a collaborative document system, as described herein.

FIG. 2A depicts the client device 104-1 displaying an example graphical user interface 200 associated with the CDS 100. The graphical user interface 200 may be rendered in a browser executing on the client device 104-1, while at least some processing tasks and other operations associated with the CDS 100 are performed by a remote server (e.g., a server of the document services system 102). In other cases, the graphical user interface 200 may be rendered by a native application executing on the client device 104-1. Regardless of architecture, it may be appreciated that generally and broadly a graphical user interface may be displayed on a client device and be operable to receive inputs from and provide outputs to a user of the CDS 100.

The graphical user interface 200 may include a document region 202 and a workspace region 204. The document region 202 may display the contents of a selected document, including text, images, videos, interactive content, or the like. The document region 202 may also include an input field 205 (e.g., to add a comment, note, or other content to a document). The graphical user interface 200 may also include selectable control elements. For example, a "spaces" control element 206 may cause the graphical user interface 200 to display the workspace region 204 and the document region 202 (also referred to as a content region), as shown in FIG. 2A. A "people" control element 208 may cause the graphical user interface 200 to display a list of users associated with the CDS 100. A "create" control element 210 may trigger a document creation request from the active workspace. As described herein, by selecting the create control element 210 may cause a document template selection interface to be displayed, which may include workspace-specific recommendations or recommendations of document templates based on actual document-creation history within the workspace.

The workspace region 204 may display a list of workspace identifiers associated with the CDS 100. As shown in the example of FIG. 2A, the workspaces include "Workspace 1—Marketing," which may be associated with a marketing department, "Workspace 2—Engineering," which may be associated with an engineering department, and "Workspace 3—Finance," which may be associated with a finance department. Of course, these are merely examples, and workspaces may have different names, different subjects, relate to different organizational or other hierarchies, etc.

Each workspace is associated with a set of user-generated documents. A list of documents in the workspace is shown in the workspace region 204 below or otherwise in conjunction with an associated workspace. Thus, for example, Workspace 1—Marketing includes documents 1-4. In some cases, workspaces may be represented by or understood a folder hierarchy. In such cases, each workspace may have an arbitrary number of sub-workspaces, and user-generated documents may be associated with or stored in any of the workspaces or sub-workspaces. Like workspaces, sub-workspaces may be arbitrarily defined by users of the CDS 100 so that the CDS best suits the users' needs.

As described herein, user-generated documents be generated in a workspace using a document template. In FIG. 2A, each document includes an identifier that corresponds to the particular document template that was used to generate the document. Thus, for example, document 1 is a "Blog Post," document 2 is "Meeting Notes," document 3 is a "Sales Target" document, and document 4 is a "Quarterly Marketing Report." Of course, these are merely examples of different document templates types. Further, the name of the document type or document template may not be displayed in conjunction with the document. They are shown here for illustrative purposes. Further, because each workspace is associated with a unique set of document templates (e.g., a unique mixture of global and local document templates), the documents in that workspace will have been generated using a document template selected from that particular workspace. In some cases, documents are generated without using a template, in which case no document template identifier may be associated with those documents.

As shown in FIG. 2A, because Workspace 1 has been selected, identifiers of documents 1-4, associated with Workspace 1, are displayed in the workspace region 204. Further, FIG. 2A shows document having been selected by the user, resulting in the contents of document 1 being shown in the document region 202. Upon selection of a different document (e.g., by a user clicking on or otherwise selecting the name of a different document), the selected document may be displayed in the document region 202.

Figure 2B:
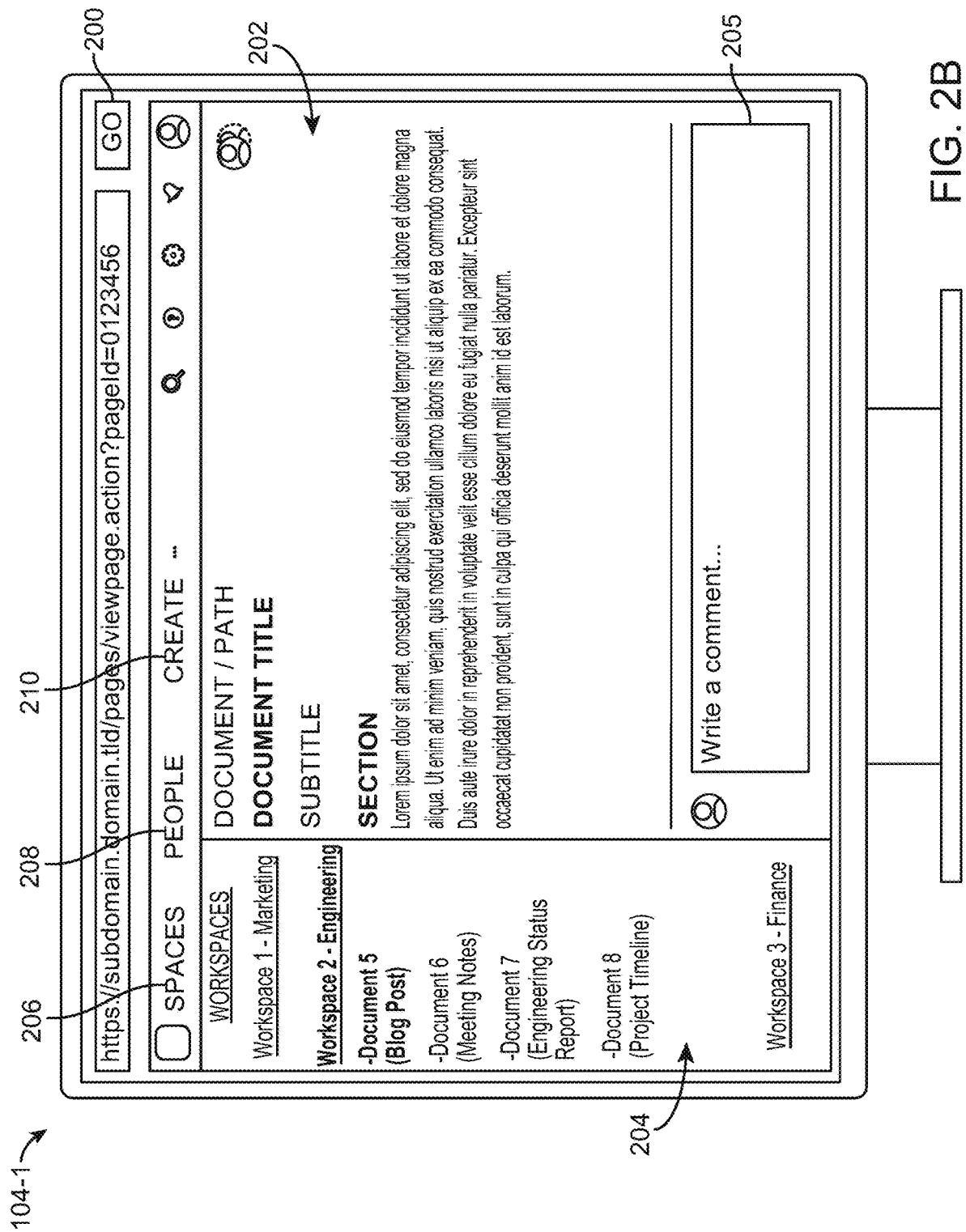

Upon selection of a different workspace (e.g., by a user clicking on or otherwise selecting the name of a different workspace), a different set of documents may be displayed in the workspace region 204. FIG. 2B, for example, illustrates the graphical user interface 200 after a user has selected Workspace 2. In response to the selection of Workspace 2, the client device 104-1 displays, in the workspace region 204, identifiers of documents associated with Workspace 2 (e.g., documents that were generated in Workspace 2), with each document including an identifier of the templates from which the document was generated. Thus, for example, document 5 is a "Blog Post," document 6 is "Meeting Notes," document 7 is an "Engineering Status Report," and document 8 is a "Project Timeline." Notably, some of these documents were generated using the same templates as documents in Workspace 1 (e.g., using global templates such as a Blog Post and a Meeting Notes document template, while others were generated with unique templates (e.g., local templates, such as the Engineering Status Report and the Project Timeline).

Figure 3A:
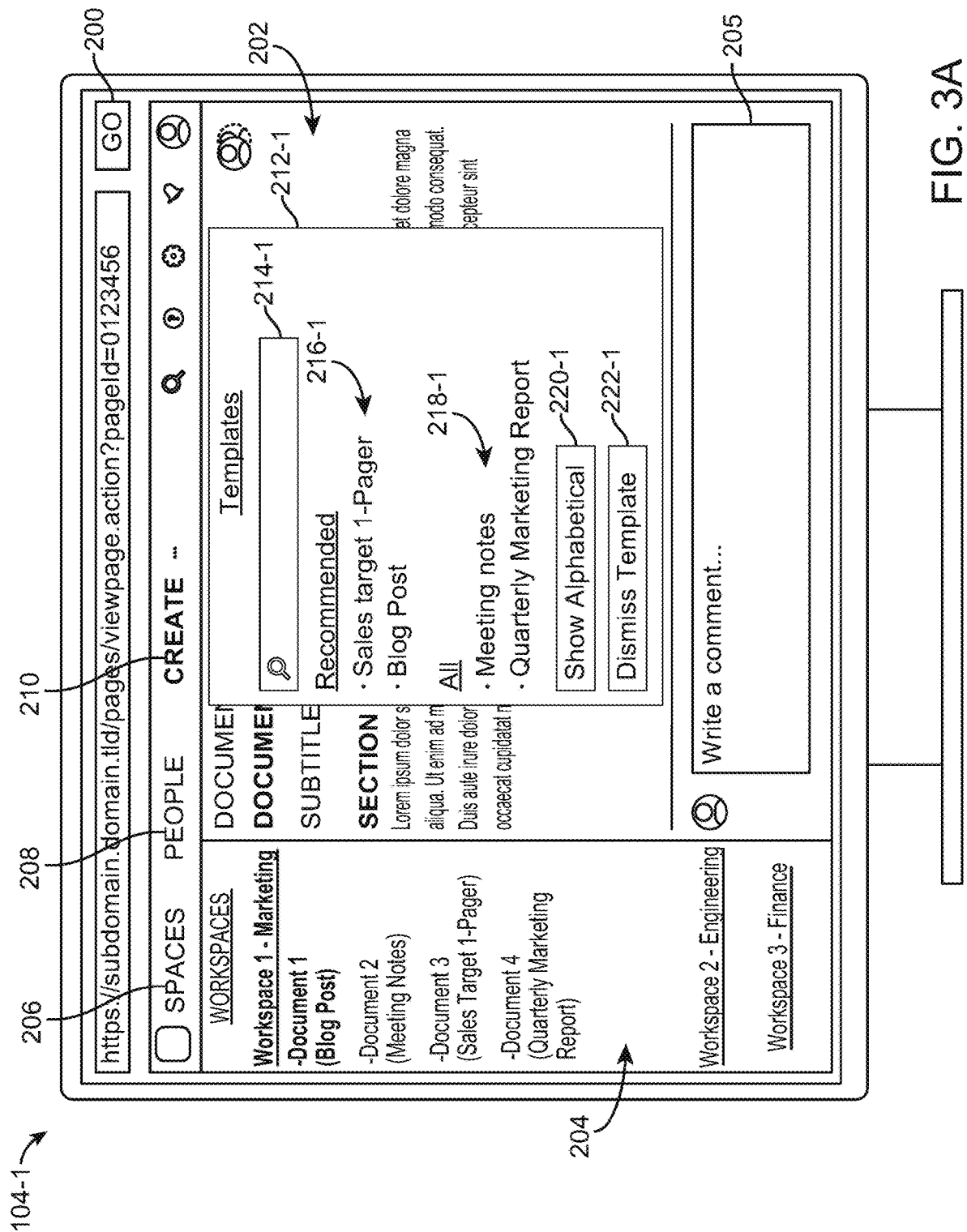
FIGS. 3A-3C depict an example client device and user interface of a collaborative document system providing document template recommendations and facilitating creation of a document using a document template.

FIG. 3A depicts the client device 104-1 after a user has selected the create control element 210. A user-selection of the create control element 210 results in a document creation request being detected by the CDS 100. In some cases, other user actions may result in a document creation request. When the create control element 210 is selected, the CDS 100 will recognize the selection as originating from the active workspace at the time of selection. Accordingly, some subsequent operations of the CDS 100, such as the provision of recommended document templates, will be performed specifically for the active workspace. FIG. 3A illustrates the create control element 210 having been selected while Workspace 1 was active. Thus, the particular document templates and document template recommendations that are offered to a user in the context of FIG. 3A are specific to Workspace 1. If a different workspace had been active, the document templates and document template recommendations would be different.

Figure 5:
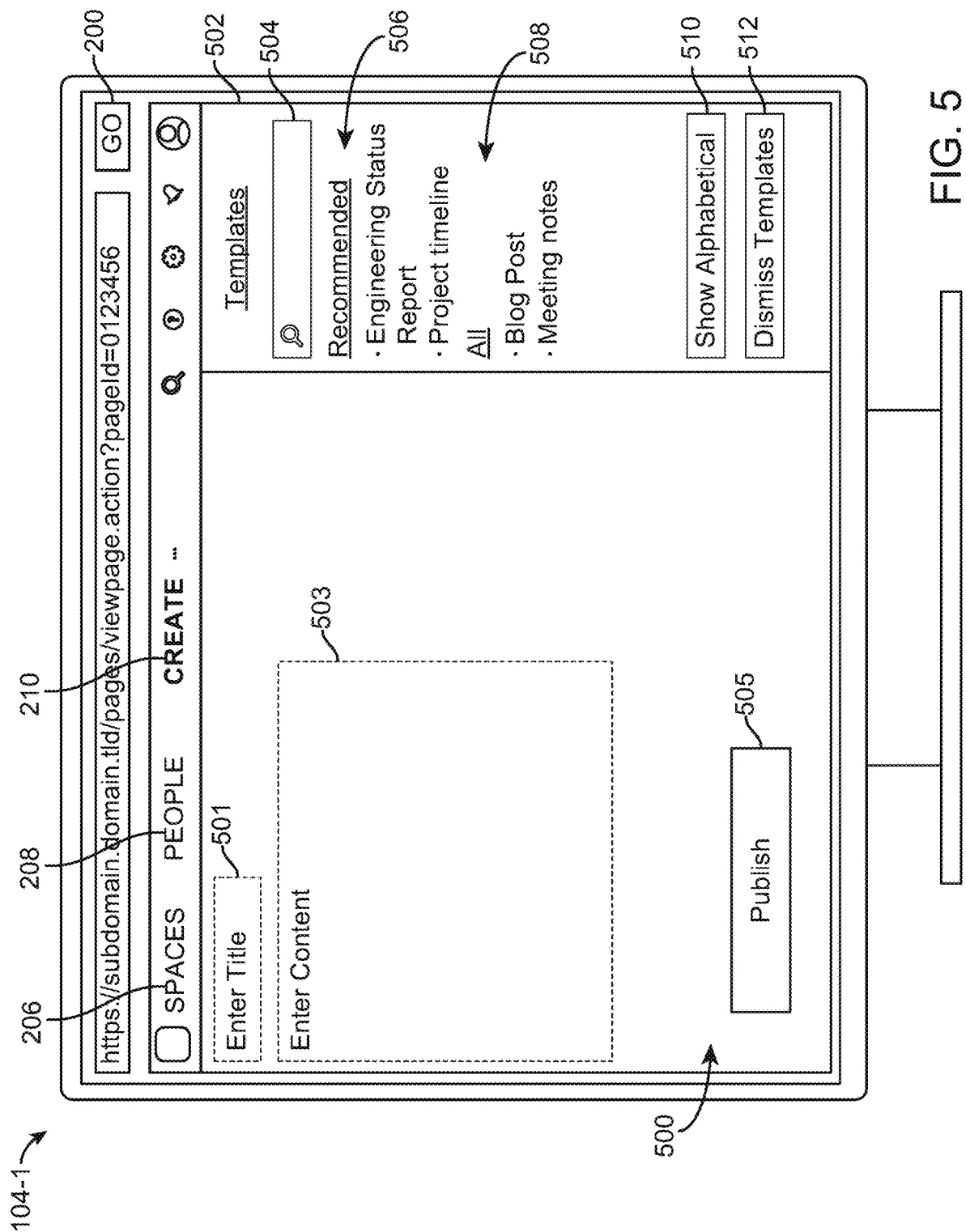
FIG. 5 depicts another example of a client device and user interface providing document template recommendations.

Responsive to the CDS 100 detecting the document creation request, the CDS 100 causes a document template selection interface 212-1 to be displayed. The document template selection interface 212-1 may be displayed in a window that is overlaid on or otherwise covers one or more elements of the graphical user interface 200 (such as a "floating" window as shown in FIG. 3A), or it may be shown in a different graphical arrangement (such as shown in FIG. 5). The document template selection interface 212-1 may include a search input field 214-1, document template recommendations 216-1, a document template list 218-1, a list display control element 220-1, and a dismiss control element 222-1. The search field input 214-1 may facilitate text-based searches for document templates. For example, a user may enter text into the search field input 214-1, and the document template selection interface 212-1 may display a list of document templates that correspond to the search input. The search function may use the text input to query text associated with the document templates (e.g., titles, content, descriptions, metadata, etc.), and then display a list of document templates that match or otherwise have a threshold relevance to the text input.

The document template list 218-1 may display a list of all document templates available in the active workspace, including both local and global document templates (and optionally omitting the document templates that are shown in the recommendation list). The document template list 218-1 may be displayed in an alphabetical order, or in any other suitable order. The dismiss control element 222-1 may dismiss the document template selection interface 212-1, allowing the user to generate a document without the use of a template (or using a default template, such as a "text document" template). The list display control element 220-1 may control how the list of document templates is displayed. For example, the list display control element 220-1 may cause all available templates (e.g., the local and global document templates of the selected workspace) to be shown in an alphabetical order. This may cause the document template recommendations 216-1 to be removed or omitted. The user can then navigate through the complete, alphabetically sorted list of document templates to find and select a desired document template. If there are more document templates than can be conveniently displayed in the document template selection interface 212-1, the document template list 218-1 may be scrollable to allow more document templates to be included in the list.

The document template recommendations 216-1 may include a list of recommended document templates, where the recommendations are based on actual usage of document templates in the selected workspace by users of the active workspace, and/or predictions of what document templates may be relevant within the active workspace. For example, responsive to the CDS 100 detecting a document creation request (e.g., the user selection of the create control element 210), the CDS 100 (e.g., the document template services 110) obtains document-creation histories for each of a plurality of document templates associated with the selected workspace, where each document-creation history corresponds to a number of times that a document template has been used to create a new document in the selected workspace. In some cases, obtaining the document-creation histories includes obtaining document-creation histories that have already been calculated, while in other cases, the document-creation histories may be obtained by determining (e.g., counting) the number of times that document templates have been used to create new documents in the selected workspace. As described herein, the document-creation histories are specific to the active workspace. Thus, responsive to the document creation request originating form Workspace 1, the CDS 100 obtains document-creation histories for documents and document templates within Workspace 1.

Based at least in part on the document-creation histories, the CDS 100 computes a respective relevance weight for each of the plurality of document templates associated with the workspace. The relevance weight of a document template may represent a number of times, within a particular time window, that the document template has been used to create a new document in the workspace. The time window may be used to provide a recency component to the relevance weight, so that document templates that have seen more recent use may be ranked higher than document templates that may have been used less recently. The time window may be fixed for all workspaces, or it may be different for different workspaces. The time window may be, for example, 1 week, 2 weeks, 3 weeks, 1 month, 3 months, 6 months, 1 year, or any other suitable time window. The relevance weight of a document template may be based on other factors in addition to or instead of the number of times it has been used in a particular time window, such as the number of different users who have used the document template, the number of different users who have viewed documents generated using the document template, etc.

Using the relevance weights for the document templates, the CDS 100 causes identifiers of at least a subset of the plurality of document templates to be displayed to the user as recommended document templates. For example, FIG. 3A depicts an example in which two document templates—a Sales Target 1-Pager and Blog Post—are displayed to the user in a list of recommended document templates. In some cases, more or fewer recommended document templates may be displayed. As described herein, because Workspace 1 includes both local and global document templates, the recommended document templates may include local and global document templates, depending on the popularity of the document templates (and optionally without any reference to whether the document template is local or global). In Workspace 1, for example, the recommended document templates include a local document template (Sales Target 1 Pager) and a global document template (Blog Post), reflecting actual usage trends in the workspace.

The identifiers of the recommended document templates may be displayed in accordance with a rank order. The rank order may result in the recommended document templates being displayed above the remaining document templates in a list of document templates, or otherwise being displayed more prominently than lower ranked document templates. For example, FIG. 3A shows the recommended document templates in a rank order in which the recommended document templates are displayed above and separately from the remaining document templates.

The rank order may be based at least in part on the computed relevance weights for the plurality of document templates. For example, the CDS 100 may display the "n" document templates with the highest relevance weights, in order of descending relevance weight, where "n" is a predefined number, such as 2, 3, 4, 5, or any other suitable number. The particular number of document template identifiers that are shown may be based on various factors, such as the maximum number of document templates that can visually fit into a particular area or region of a graphical user interface. In some cases, only those document templates with relevance weights above a threshold value are displayed as recommended or suggested document templates. The relevance weight threshold helps ensure that the document templates recommended by the CDS 100 have a minimum level of relevance within a workspace. For example, employing the threshold relevance weight can ensuring that the CDS 100 does not recommend document templates whose higher document-creation history is not statistically significant. If there are more recommended document templates than can be conveniently displayed in the document template selection interface 212-1, the list of recommended document templates may be scrollable to allow more document templates to be included in the list.

As noted above, displaying the document templates in rank order may include displaying document templates whose relevance weights are above a threshold value separately from document templates whose relevance weights are below the threshold value. For example, FIG. 3A illustrates the recommended document templates 216-1 (whose relevance weights are above a threshold value) shown separately from the rest of the document templates of the active workspace (e.g., the document template list 218-1). In other examples, displaying the document templates in rank order may include displaying the recommended document templates at the top of a single continuous list of document templates (where document templates below the recommended document templates are shown in alphabetical order). Other ways of indicating which document templates are recommended are also contemplated, such as showing the recommended document templates in a different font (e.g., bold, italics, larger font size), showing a graphic proximate the recommended document templates (e.g., a star), or the like. In some cases, the document template list 218-1 may include all document templates associated with the active workspace (including those in the recommended list), or it may omit the recommended document templates that are displayed separately from the others.

Figure 3B:
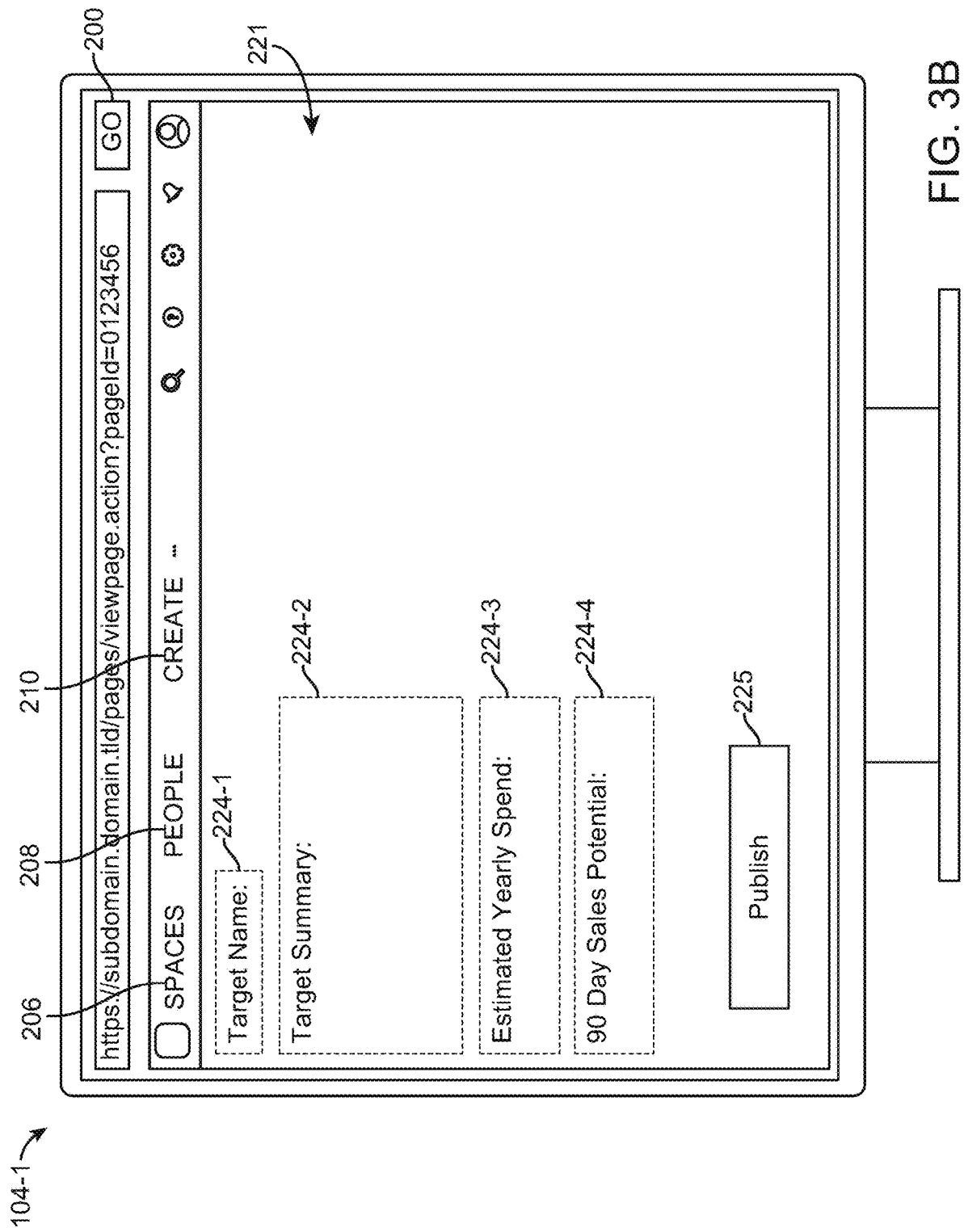

Once presented with the identifiers of the document templates, a user may select one of the document templates (e.g., by clicking on one of the identifiers with a cursor, touch input, etc.). Upon detecting a user selection of an identifier, the CDS 100 causes the document template associated with the selected identifier to be displayed to the user. FIG. 3B illustrates the client device 104-1 after a user selected the Sales Target 1-Pager document template and the client device 104-1 has displayed the associated document template 221. Document templates may include numerous possible elements to facilitate document creation. For example, document templates may include text input fields, graphics, layouts, sample text, instructions, headings, pre-formatted lists, interactive and/or programmatic elements (e.g., selectable check-boxes or buttons), configurable hyperlinks (e.g., pre-formatted links or buttons that a user can supply with an address), or the like. The example Sales Target 1-Pager document template 221, includes text input fields 224-1 through 224-4, including field 224-1 for a target name, field 224-2 for a summary of the sales target, field 224-3 for an estimated yearly expenditure of the sales target, and field 224-4 for an estimated sales potential from the target. Of course, these are merely example fields that may be present in a document template, and other document templates may have different content, different graphical layouts, and the like.

Document templates may also include a user-selectable control element that causes a document to be generated and stored. Thus, for example, FIG. 3B includes a "publish" control element 225, which, when selected, generates a document using the document template definition and any user-supplied content (e.g., text, graphics, selections, etc.). More particularly, the selection of the publish control element 225 may initiate a document generation request, which is detected by the CDS 100 and causes the CDS 100 to generate the document using the document template.

The user-generated document may then be stored by the CDS 100 (e.g., in the document store 122) and associated with the relevant workspace (e.g., Workspace 1). Other data relating to the user-generated document may also be stored, including the author, the time of creation, the document template that was used to generate the document (which ultimately corresponds to another count in the document-creation history for that template), and the like.

Figure 3C:
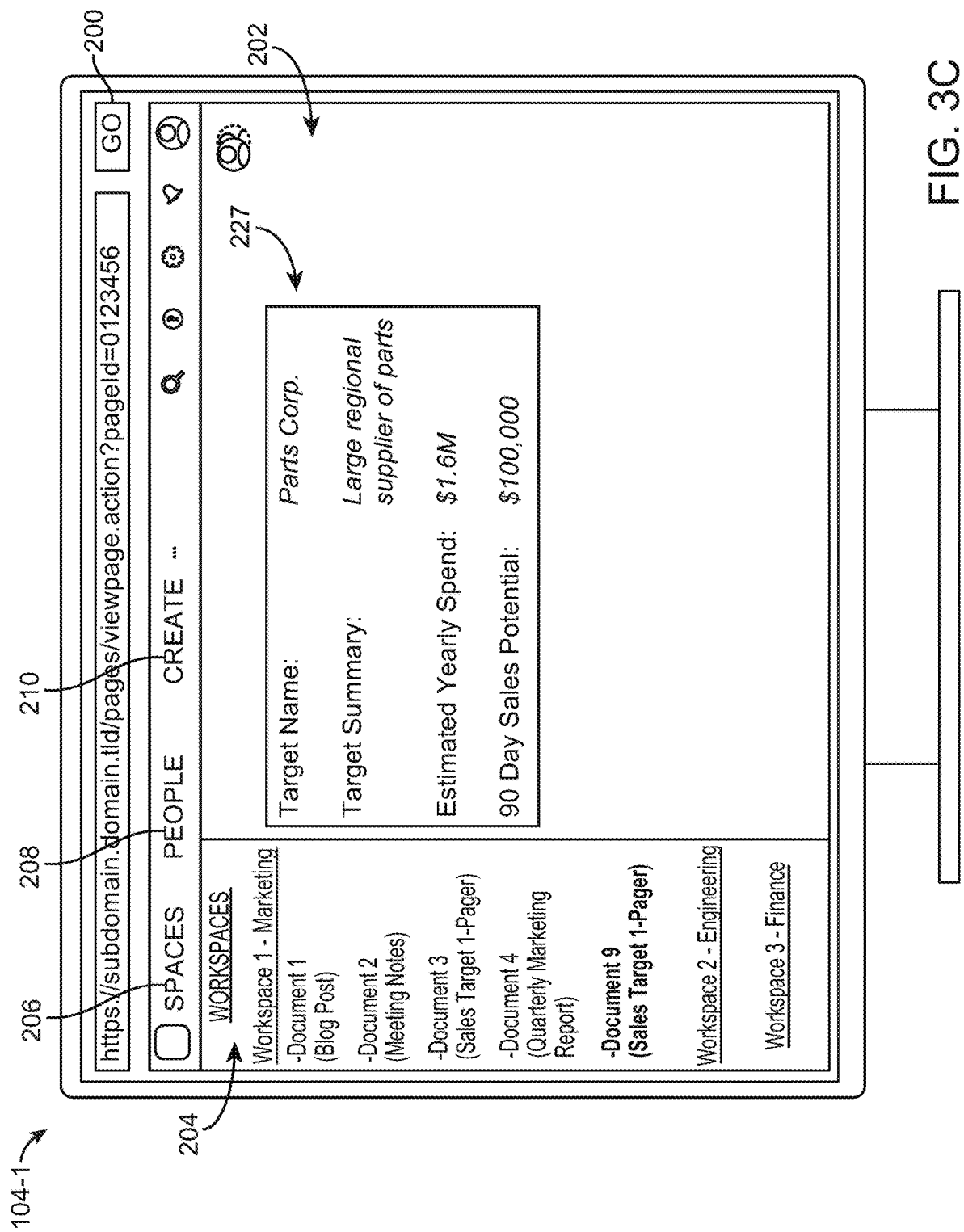

FIG. 3C illustrates the client device 104-1 after the document template 221 has been completed and the document generated using the document template 221 has been published. An identifier of the document has been added to the list of documents associated with Workspace 1 in the workspace region 204, and the associated document 227 is shown in the document region 202. The contents of the document 227 and the layout and appearance of the document in the document region 202 are merely for illustrative purposes, and other documents may have different content, layouts, appearances, etc.

Figure 4:
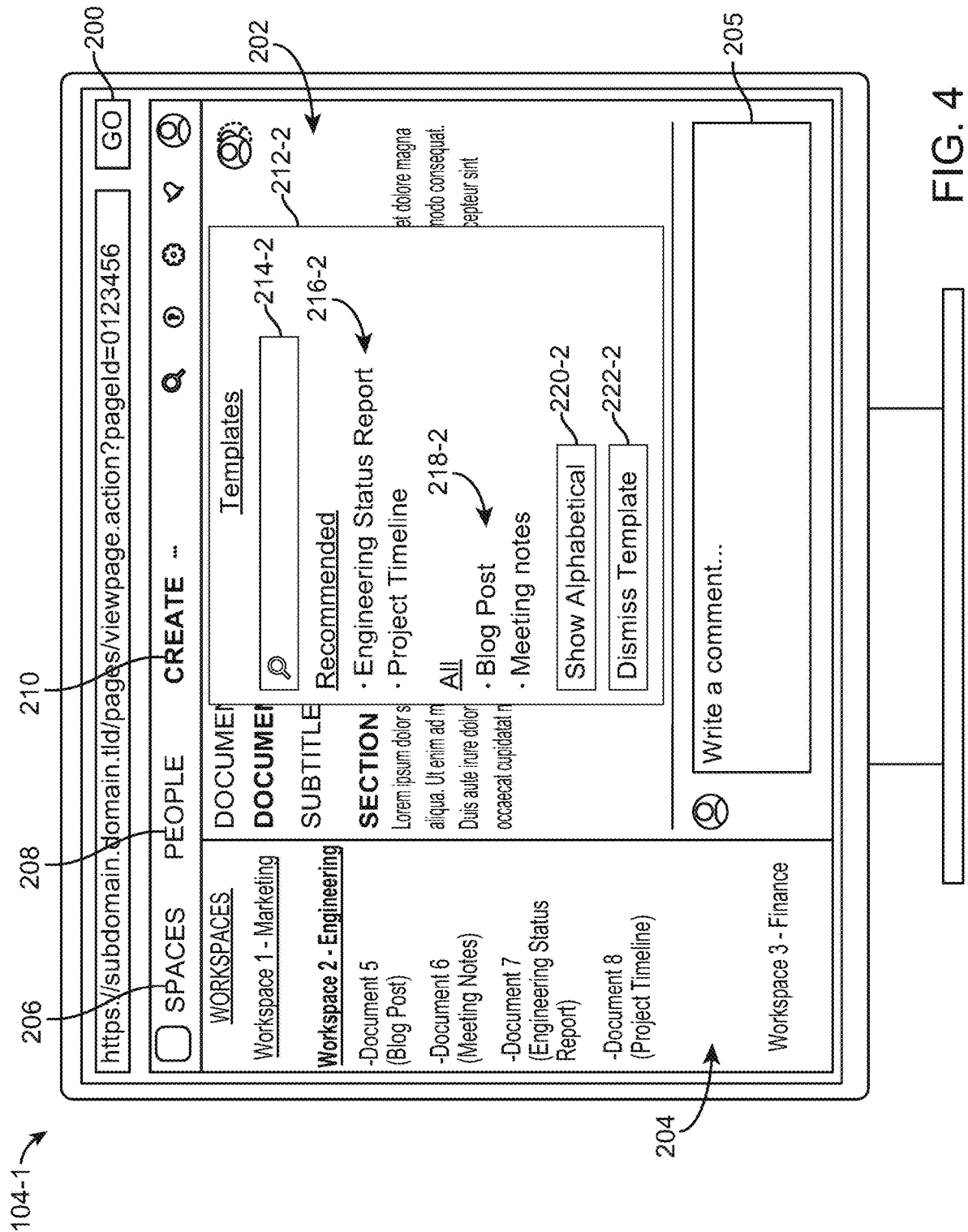
FIG. 4 depicts another example of a client device and user interface providing document template recommendations.

As described herein, the document template recommendations are workspace specific, as they are based on document-creation histories in each workspace. FIG. 3A depicts the client device 104-1 after a user has selected the create control element 210 while in Workspace 1, showing the recommended document templates for Workspace 1. FIG. 4 depicts the client device 104-1 after a user has selected the create control element 210 while in Workspace 2, showing the recommended document templates for Workspace 2. In particular, when the create control element 210 is selected, the CDS 100 will recognize the selection as originating from the Workspace 2, causing the CDS 100 to display the document template selection interface 212-2, which includes a search input field 214-2, document template recommendations 216-2, a document template list 218-2, a list display control element 220-2, and a dismiss control element 222-2. The search input field 214-2, document template recommendations 216-2, document template list 218-2, list display control element 220-2, and dismiss control element 222-2 operate in the same manner as the corresponding elements described with respect to FIG. 3A, and the discussion of those elements is equally applicable here.

Because document templates and document template recommendations are unique to each workspace, the document template identifiers shown in the document template selection interface 212-2 for Workspace 2 are different than those shown in conjunction with Workspace 1. For example, the document template list 218-2 includes a different set of document templates than are displayed in Workspace 1. Similarly, the document template recommendations 216-2 are also different, reflecting both the different document templates associated with Workspace 2 as well as the different document-creation histories for Workspace 2. As shown in FIG. 4, the recommended document templates are all local document templates that are unique to Workspace 2, reflecting the different usage patterns in Workspace 2. Document-creation histories are generated for Workspace 2 in the same or similar manner as described above with respect to Workspace 1, and they are displayed in the same manner as described with respect to Workspace 1, and the discussion of those operations is equally applicable here.

FIGS. 3A and 4 illustrate one example manner of displaying a document template selection interface. For example, FIGS. 3A and 4 show the document template selection interface 212 displayed as a window that is positioned over or otherwise covers part of the document region 202 of the graphical user interface 200. After selection of a document template, the graphical user interface 200 replaces the document region 202 and the workspace region 204 with the document template itself (as shown in FIG. 3B). FIG. 5 illustrates another example scheme for responding to a document creation request. In particular, FIG. 5 illustrates an example document creation interface 500 that may be displayed in response to a user selecting the create control element 210 while Workspace 2 is selected (e.g., the document creation request triggered by the selection of control element 210 originates from Workspace 2). Instead of displaying the document template selection interface 212-2 in an overlay region, as shown in FIG. 4, the workspace region 204 and the document region 202 may be replaced by the document creation interface 500. The document creation interface 500 may include a set of default input fields (e.g., input fields 501, 503) to allow a user to generate a document without a template. The input fields 501 and 503 are merely examples, and in some cases the document creation interface may include more, fewer, or different elements, such as a single input field that may resemble a word processing or other document creation application.

In addition to the document creation interface 500, the client device 104-1 may display a document template selection interface 502, which may be shown in a graphically separated region from the document creation interface 500 (e.g., resembling a side bar or pane along a side of the document creation interface 500). The document template selection interface 502 may include the same or similar content as the document template selection interface 212, such as a search input field 504, document template recommendations 506, a document template list 508, a list display control element 510, and a dismiss control element 512. Because the document template selection interface 502 is displayed in response to a document creation request in Workspace 2, the recommended document templates and the document template list are the same as those shown in FIG. 4 for Workspace 2. Upon selection of the dismiss control element 512, the document template selection interface 502 may cease to be displayed, and the default document creation interface 500 may be displayed, allowing a user to generate a document without using a document template. If one of the document templates is selected from the document template recommendations 506 or the document template list 508, the default input fields may be removed, and the document creation interface 500 may instead be populated with the elements of the selected document template (e.g., the text input fields, graphics, layouts, sample text, instructions, headings, pre-formatted lists, interactive and/or programmatic elements, etc., of the selected document template). The user can then use the document template to input the desired content and then select a "publish" control element 505 to generates the document using the document.

As described above, document-creation histories may be obtained by the CDS 100 in order to determine what document templates to recommend to a user and how to rank the document templates. FIGS. 6A-6B illustrate example data structures illustrating how document-creation histories may be obtained for Workspace 1 and Workspace 2. In particular, the data structure 600 in FIG. 6A shows each document template 602 associated with Workspace 1 (including both local and global document templates), along with document creation counts 604 for each document template. The document creation counts 604 indicate how many documents have been generated in Workspace 1 using each of those document templates. In some cases, the document creation counts 604 indicate how many documents have been generated in Workspace 1 using each of those document templates within a time window (e.g., the previous 1 week, 1 month, 3 months, etc.). In other cases, the document creation counts 604 indicate how many documents have been generated in Workspace 1 using each of those document templates without regard to any time window (e.g., a total document creation count). The document creation counts 604 may be used by the CDS 100 to compute the relevance weights for each of the document templates in the workspace. Thus, for example, the Sales Target 1-Pager document template may have a highest relevance weight, followed by the Blog Post document template, the Meeting Notes document template, and the Quarterly Marketing Report document template. Of course, other factors may be included in the computation of the relevance weights, such as the number of unique users who have generated documents using the document template.

The data structure 610 in FIG. 6B shows each document template 612 associated with Workspace 2 (including both local and global document templates), along with document creation counts 614 for each document template. The document creation counts 614 indicate how many documents have been generated in Workspace 2 using each of those document templates. In some cases, the document creation counts 614 indicate how many documents have been generated in Workspace 2 using each of those document templates within a time window (e.g., the previous 1 week, 1 month, 3 months, etc.). In other cases, the document creation counts 614 indicate how many documents have been generated in Workspace 2 using each of those document templates without regard to any time window (e.g., a total document creation count). The document creation counts 614 may be used by the CDS 100 to compute the relevance weights for each of the document templates in the workspace. Thus, for example, the Engineering Status Report document template may have a highest relevance weight, followed by the Project Timeline document template, the Blog Post document template, and the Meeting Notes document template. Of course, other factors may be included in the computation of the relevance weights, such as the number of unique users who have generated documents using the document template.

FIGS. 6A-6B illustrate how users in different workspace may use local and global document templates with different frequencies, resulting in a different combination of local and global document templates in the recommended document templates. For example, the Blog Post document template is used frequently enough in Workspace 1 that it would be a recommended document template, while it is used relatively infrequently in Workspace 2, such that it would not be included in the recommended document templates in Workspace 2.

Document template recommendations may be useful to the extent that they reflect actual usage and/or popularity of document templates. If, on the other hand, the document template recommendations are not reflective of document templates that are commonly used, they may be ignored by users and may simply be a nuisance. Such conditions may occur, for example, when a CDS 100 has only been recently put into use or when a new workspace has been introduced, in which cases there may not enough document-creation histories from which relevant usage patterns can be obtained. Accordingly, when determining whether to provide recommended document templates to a user, the CDS 100 may determine whether usage attributes of the document templates in a workspace satisfy a usage condition. If the usage attributes satisfy the usage condition, indicating that there is enough usage data to provide reliable and/or accurate document template recommendations, then the CDS 100 may display recommended document templates to the user upon request (e.g., in response to a user selection of a document creation request). If the usage attribute does not satisfy the usage condition, indicating that there is not enough usage data to provide reliable and/or accurate document template recommendations, then the CDS 100 may display a different set of document templates. For example, instead of providing recommended document templates, the CDS 100 may provide an alphabetical list of all document templates (which may include only global document templates if no local document templates have been created), in which the alphabetically first document templates are displayed, and other document templates in the list are accessible by scrolling or otherwise navigating through the list.

Figure 7A:
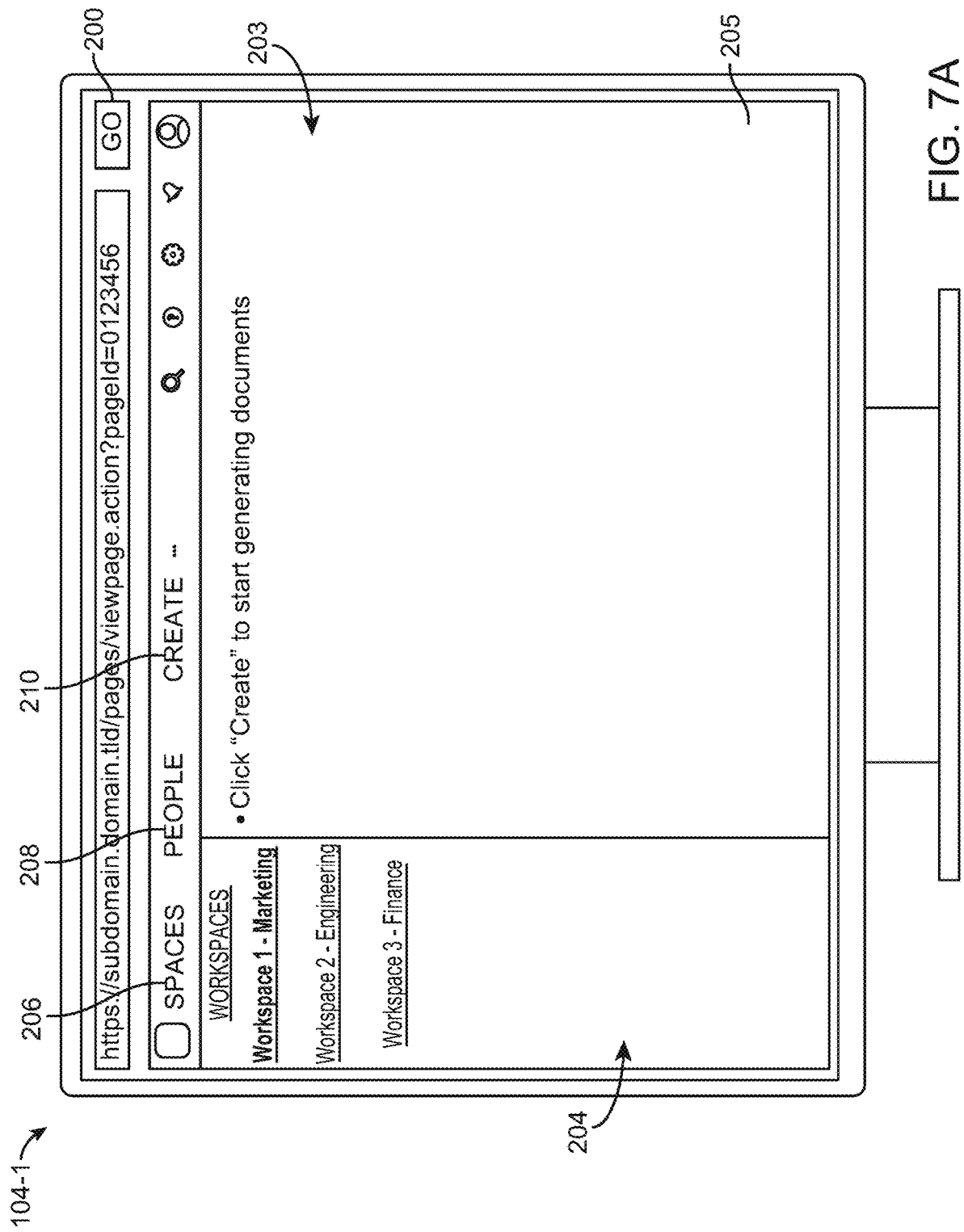
FIGS. 7A-7B depict an example client device and user interface showing an example of how document templates are presented when a usage condition is not satisfied.
Figure 7B:
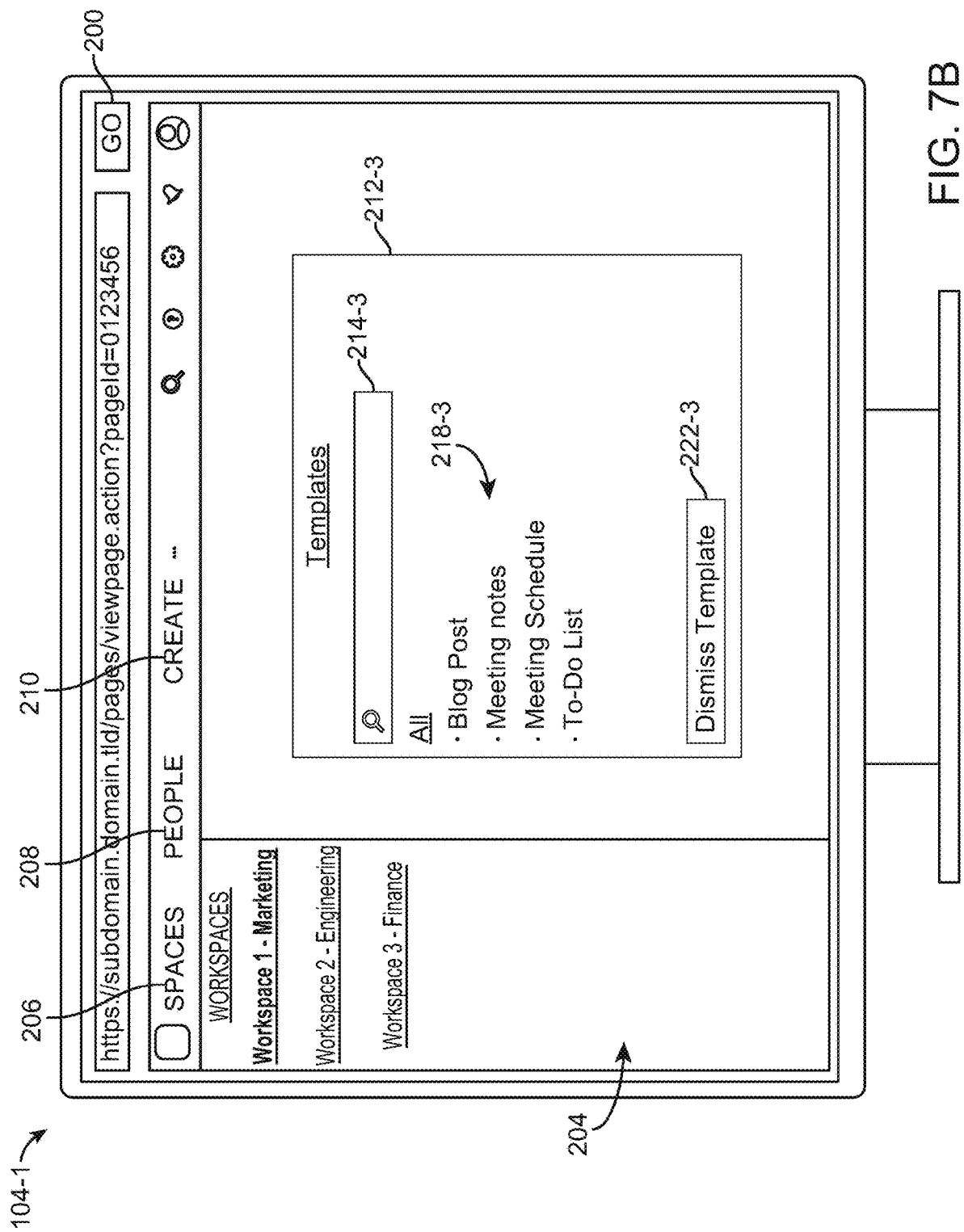

FIGS. 7A-7B illustrate how a list of document templates may be displayed on the client device 104-1 if usage attributes of the document templates do not satisfy a usage condition. For example, FIG. 7A illustrates a condition in which Workspace 1 does not include any user-generated documents. In this condition, the graphical user interface 200 may show no documents listed under the selected workspace in the workspace region 204, and may show a document creation prompt 203, reflecting the lack of a document to display (or reflecting that no document is currently selected). A user may select the create control element 210 to initiate a document creation request. Upon detecting the document creation request, the CDS 100 determines, for the selected workspace (Workspace 1), respective document-creation histories for each of a plurality of document templates associated with the workspace. In the example shown in FIGS. 7A-7B, the document templates may include only global document templates (and/or only system-supplied document templates).

The CDS 100 then determines, using the document-creation histories, whether a usage attribute of the document templates satisfies a usage condition, such as whether or not there has been a threshold number of documents generated using document templates in the workspace. If the usage condition is satisfied, indicating that there is enough template usage data to provide meaningful and relevant recommendations, the CDS 100 may provide document template recommendations to the user, such as shown in FIG. 3A. If the usage attribute fails to satisfy the usage condition, indicating that there is insufficient template usage to provide meaningful and relevant recommendations, the CDS 100 may omit the recommendations, and simply provide a list of document templates. For example, FIG. 7A illustrates the graphical user interface 200 displaying a template selection interface 212-3, which includes a document template list 218-3 (e.g., an alphabetical listing of all available document templates, which may all be global and/or system-supplied document templates). The user may then select one of the document templates for use, or dismiss the template selection interface 212-3 and proceed without a template. As described above, the document template list may include more document template identifiers than can be legibly displayed at one time. Accordingly, only some of the document templates may be displayed at a given time, though the list may be scrollable or otherwise navigable to facilitate access to other document templates.

Similar to the other template selection interfaces 212, the template selection interface 212-3 may include a search input field 214-3 to facilitate text-based searches for document templates and a dismiss control element 222-3 to allow the user to dismiss the document template selection interface 212-3.

Figure 8:
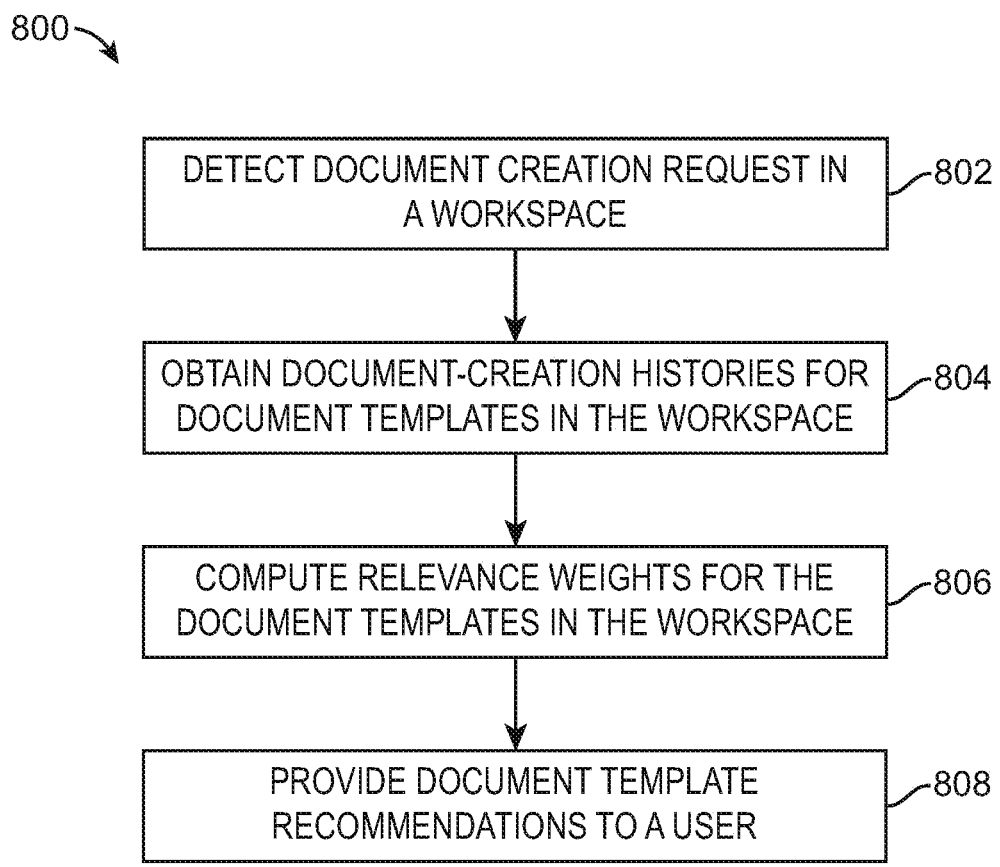
FIG. 8 depicts an example process for providing document template recommendations.

FIG. 8 is a flow chart of an example process 800 for providing document template recommendations in a collaborative document system. The process 800 may be performed by devices and/or services of a collaborative document system, such as the CDS 100, including, for example, a document services system 102. The collaborative document system may include a plurality of user-generated documents, each associated with a unique workspace of the collaborative document system. Further, the collaborative document system may include a plurality of workspaces, each workspace associated with a different set of the user-generated documents and organized in a different organizational hierarchy.

At operation 802, a document creation request, originating from a workspace of the collaborative document system, may be detected from a user. As described above, a document creation request originating from a workspace may correspond to (or be initiated by) a user selection of a document creation button or other control element while a particular workspace is active.

At operation 804, responsive to detecting the document creation request, respective document-creation histories may be obtained for each of a plurality of document templates associated with the workspace. In some cases, obtaining document-creation histories may include calculating, counting, or otherwise determining the document-creation histories. Each respective document-creation history may correspond to a number of times a respective document template has been used to create a new document in the workspace. As described above, document-creation histories may be useful in determining the popularity of document templates in a workspace.

At operation 806, a respective relevance weight for each of the plurality of document templates associated with the workspace may be computed. The relevance weights may be based at least in part on the respective document-creation histories obtained at operation 804. For example, a respective relevance weight may represent a number of times a respective document template has been used to create a new document within a time window (e.g., the previous 1 week, 1 month, 3 months, etc.). Other factors may also be used to compute relevance weights. For example, relevance weights may be based on an amount of unique users that have generated documents using a particular template. Thus, for example, a document template that is used frequently, but only by a small number of users, may have a lower relevance weight than document templates that are used frequently by a larger number of users (or possibly lower than document templates that are used less frequently by a larger number of users).

As another example, relevance weights may be based on a size of time distribution of use of the document templates. For example, document templates that are used frequently, but only within a short time window (e.g., 1 week in a 3 month period) may have lower relevance weights than document templates that have a more uniform usage frequency (e.g., document templates that many users use fairly consistently over the 3 month window). Other factors may also be used to compute the relevance weights.

In some cases, document-creation histories for document templates may also be analyzed to determine whether or not their usage satisfies a criteria, where the criteria includes a statistical significance condition. For example, if a document template has a higher usage count than other document templates, but the higher count is not statistically significant, it may be omitted from the subset of document templates that are recommended to a user. If the higher count for a document template is statistically significant, it may be included in the subset of document templates that are recommended. In order to determine whether a document template has a statistically significant usage, the collaborative document system may determine an average usage metric (e.g., an average usage frequency) of the plurality of document templates, and determine a usage metric (e.g., usage frequency) of a particular document template of the plurality of document templates. In accordance with a determination that a difference between the usage metric of the particular document template and the average usage metric of the plurality of document templates satisfies a statistical significance condition (e.g., a significance level of 5%, 2%, or another suitable level), the particular document template is included in the subset of the plurality of document templates. If it fails to satisfy the statistical significance condition, the particular document template is excluded from the plurality of document templates (e.g., it is not displayed to the user as a recommendation).

At operation 808, identifiers of at least a subset of the plurality of document templates are displayed to the user in accordance with a rank order, where the rank order is based at least in part on the computed relevance weights for the plurality of document templates. For example, as illustrated in FIGS. 3A, 4, and 5, document templates may be listed in a rank order in which recommended document templates are displayed above, separately, and/or more prominently than other document templates (which may be provided in a navigable list including all document templates of a workspace).

After the identifiers of the recommended document templates are displayed to the user, a user selection of an identifier of the displayed identifiers may be detected, and, in response to detecting the user selection, the selected document template may be displayed to the user.

In some cases, document template recommendations may be user specific. For example, the collaborative document system may, in response to detecting a document creation request, obtain document-creation histories only for the user who has initiated the document creation request (and also optionally limited to the active or selected workspace), compute relevance weights based on the user-specific document-creation histories, and provided document template recommendations based on the relevance weights. This may provide document template recommendations that are tailored to each individual user.

The process of determining document template recommendations, as outlined with respect to the process 800, may be performed separately for different workspaces so that document template recommendations are customized for the individual workspace. Thus, the operations of the process 800 may be performed for a first workspace, and then may be repeated for a different workspace. For example, a second document creation request originating from a second workspace of the collaborative document system may be detected, where the second workspace is different from the first workspace. Responsive to detecting the second document creation request, respective second document-creation histories are obtained for each of a second plurality of document templates associated with the second workspace. A respective relevance weight for each of the second plurality of document templates associated with the second workspace may be obtained, and identifiers of at least a subset of the second plurality of document templates to be displayed to the user in accordance with a second rank order based at least in part on the computed relevance weights for the second plurality of document templates.

As described herein, the document templates associated with the first and second workspaces may be different, resulting in different document templates being recommended in each workspace. For example, the first plurality of document templates for the first workspace may include a first group of document templates that are available in multiple workspaces (e.g., global document templates) and a second group of document templates that are available only in the first workspace (e.g., local document templates of the first workspace), while the second plurality of document templates may include the first group of document templates (e.g., the same global document templates as the first workspace) and a third group of documents that are available only in the second workspace (e.g., local document templates of the second workspace). Further, if a user creates local document templates in the first workspace, those document templates may be associated with the first workspace (e.g., in the first plurality of document templates) and not the second workspace (e.g., not in the second plurality of document templates), while local document templates created in the second workspace may be associated with the second workspace and not the first workspace.

The process 800 may be initiated by a user's interactions with a graphical user interface on a display of a client device. For example, the collaborative document system may cause a client device to display a graphical user interface that defines a first region and a second region. A plurality of workspace identifiers may be displayed in the first region (e.g., the workspace region 204, FIG. 2A), with each respective workspace identifier associated with a respective set of user-generated documents. In some cases, workspace identifiers may be displayed in a different region of the graphical user interface instead of or in addition to the first region. A user may select a workspace identifier from the plurality of workspace identifiers, causing a plurality of document links to be displayed in the first region (e.g., the workspace region 204, FIG. 2A), with each respective document link corresponding to a respective user-generated document associated with the workspace.

Once a workspace is selected, subsequent actions, such as the process 800, may occur in the context of the selected workspace. Further, information displayed as a result of the process 800 may be displayed in particular locations in the graphical user interface. For example, the identifiers of the recommended document templates may be displayed in a second region of the graphical user interface, and, upon a user selection of a document template, the document template may be displayed in the second region of the graphical user interface (or a different region). Once user-generated content has been received in the document template, the collaborative document system may receive a document generation request (e.g., a user selection of a "publish" control element), and, in response, incorporate the user-generated content into a document based on the document template and store the document in association with the selected workspace.

Figure 9:
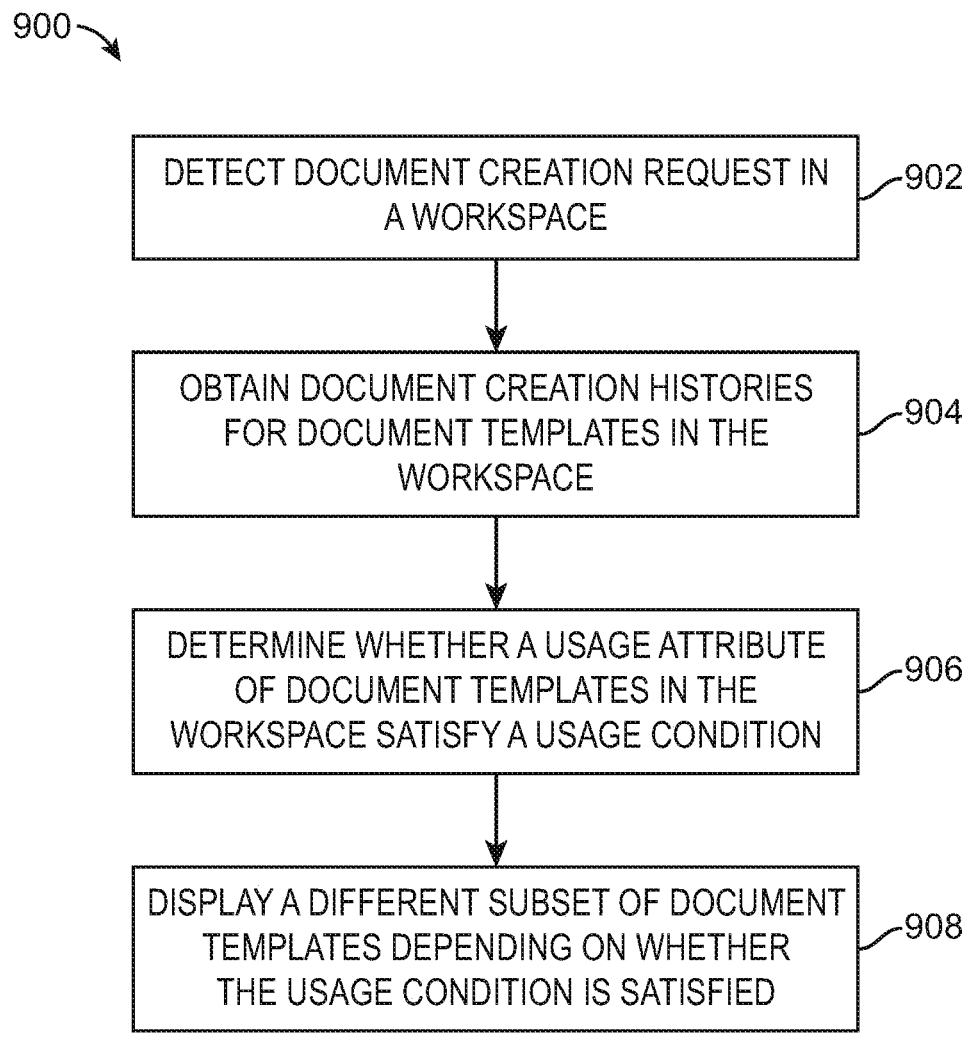
FIG. 9 depicts another example process for providing document template recommendations.

FIG. 9 is a flow chart of an example process 900 for providing document template recommendations in a collaborative document system. More particularly, the process 900 describes an example of how a collaborative document system may determine whether or not to provide document template recommendations based on the likelihood that the recommendations will be relevant. This process may be useful in the context of a new or recently commissioned collaborative document system, in which there may not be sufficient usage data to ensure that recommendations are relevant. The process 900 may be performed by devices and/or services of a collaborative document system, such as the CDS 100, including, for example, a document services system 102. The collaborative document system may include a plurality of user-generated documents, each associated with a unique workspace of the collaborative document system. Further, the collaborative document system may include a plurality of workspaces, each workspace associated with a different set of the user-generated documents and organized in a different organizational hierarchy.

At operation 902, a document creation request originating from a workspace of the collaborative document system may be detected. As described above, a document creation request originating from a workspace may correspond to (or be initiated by) a user selection of a document creation button or other control element while a particular workspace is active.

At operation 904, responsive to detecting the document creation request, respective document-creation histories for each of a plurality of document templates associated with the workspace are obtained for the workspace. Each respective document-creation history may correspond to a number of times a respective document template has been used to create a new document in the workspace.

At operation 906, it is determined, using the respective document-creation histories, whether a usage attribute of the plurality of document templates satisfies a usage condition. For example, the usage attribute may satisfy the usage condition if an amount of documents in the workspace is greater than a threshold amount (e.g., 20 documents, 50 documents, 100 documents, or another suitable threshold amount). This may help ensure that recommendations are not provided when there is not enough document-creation history within the workspace form which meaningful document template recommendations may be generated. As another example, the usage attribute may satisfy the usage condition if an amount of documents in the workspace is greater than a first threshold amount, and an amount of unique users who have generated documents in the workspace is greater than a second threshold amount. This may help ensure that recommendations are not provided when document-creation are dominated by a single or small number of users. More particularly, the document-creation histories of a single user in a workspace may not be representative of the overall document creation trends in that workspace. Accordingly, ensuring that there are sufficient users' document-creation histories represented in the data may make the document template recommendations more relevant.

At operation 908, a subset of available document templates is displayed to a user depending on whether the usage condition is satisfied. Responsive to the usage attribute failing to satisfy the usage condition, a first set of identifiers corresponding to a first subset of the plurality of document templates may be displayed the user. The first subset of the plurality of document templates may correspond to the first document templates in an alphabetical list of document templates. For example, if the usage attribute fails to satisfy the usage condition (e.g., there is not enough or good enough data to formulate relevant recommendations), the collaborative document service simply displays the first part of the alphabetical list, without displaying any specific recommendations. FIG. 7B illustrates an example of a client device displaying a first subset of the plurality of document templates, after determining that the usage attribute failed to satisfy a usage condition.

Responsive to the usage attribute satisfying the usage condition, a second set of identifiers corresponding to a second subset of the plurality of document templates may be displayed the user, the second subset different from the first subset. The second subset of the plurality of document templates may correspond to a set of document templates that include recommended document templates, which may be displayed prominently, and may be shown separately from a general listing of available document templates. FIGS. 3A, 4, and 5 illustrate examples of a client device displaying a second subset of the plurality of document templates (e.g., the recommended document templates and the start of the full list of available document templates) after determining that the usage attribute fails to satisfy the usage condition. Notably, the document template listing shown in FIG. 7 (e.g., the first subset) is simply the first four document templates in an alphabetical list, while the document templates listed in FIGS. 3A, 4, and 5 (e.g., the second subset) includes a list of recommended document templates and the first two document templates in an alphabetical list. Accordingly, the first and second subsets of document templates are different.

Figure 10:
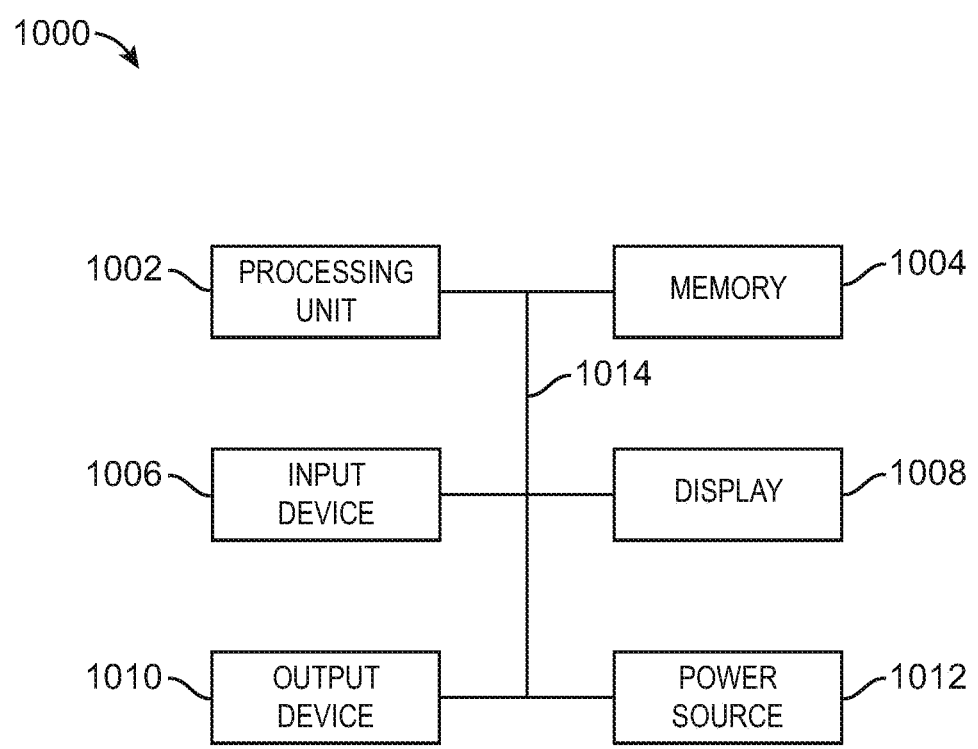
FIG. 10 depicts a sample electrical block diagram of an electronic device that may perform the operations described herein.

FIG. 10 illustrates a sample electrical block diagram of an electronic device 1000 that may perform the operations described herein. The electronic device 1000 may in some cases take the form of any of the electronic devices described with reference to FIGS. 1A-7B, including client devices 104 and/or servers or other computing devices associated with the collaborative document system 100 (e.g., the document services system 102, the predictive data sources 108). The electronic device 1000 can include one or more of a display 1012, a processing unit 1002, a power source 1014, a memory 1004 or storage device, input devices 1006, and output devices 1010. In some cases, various implementations of the electronic device 1000 may lack some or all of these components and/or include additional or alternative components.

The processing unit 1002 can control some or all of the operations of the electronic device 1000. The processing unit 1002 can communicate, either directly or indirectly, with some or all of the components of the electronic device 1000. For example, a system bus or other communication mechanism 1016 can provide communication between the processing unit 1002, the power source 1014, the memory 1004, the input device(s) 1006, and the output device(s) 1010.

The processing unit 1002 can be implemented as any electronic device capable of processing, receiving, or transmitting data or instructions. For example, the processing unit 1002 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 1000 can be controlled by multiple processing units. For example, select components of the electronic device 1000 (e.g., an input device 1006) may be controlled by a first processing unit and other components of the electronic device 1000 (e.g., the display 1012) may be controlled by a second processing unit, where the first and second processing units may or may not be in communication with each other.

The power source 1014 can be implemented with any device capable of providing energy to the electronic device 1000. For example, the power source 1014 may be one or more batteries or rechargeable batteries. Additionally or alternatively, the power source 1014 can be a power connector or power cord that connects the electronic device 1000 to another power source, such as a wall outlet.

The memory 1004 can store electronic data that can be used by the electronic device 1000. For example, the memory 1004 can store electronic data or content such as, for example, audio and video files, documents and applications, device settings and user preferences, timing signals, control signals, and data structures or databases. The memory 1004 can be configured as any type of memory. By way of example only, the memory 1004 can be implemented as random access memory, read-only memory, Flash memory, removable memory, other types of storage elements, or combinations of such devices.

In various embodiments, the display 1012 provides a graphical output, for example associated with an operating system, user interface, and/or applications of the electronic device 1000 (e.g., a graphical user interface associated with a collaborative document system, which may include graphical elements related to delivering document template recommendations, displaying documents, displaying document templates from which documents may be generated, displaying a workspace and/or document hierarchy, etc.). In one embodiment, the display 1012 includes one or more sensors and is configured as a touch-sensitive (e.g., single-touch, multi-touch) and/or force-sensitive display to receive inputs from a user. For example, the display 1012 may be integrated with a touch sensor (e.g., a capacitive touch sensor) and/or a force sensor to provide a touch- and/or force-sensitive display. The display 1012 is operably coupled to the processing unit 1002 of the electronic device 1000.

The display 1012 can be implemented with any suitable technology, including, but not limited to liquid crystal display (LCD) technology, light emitting diode (LED) technology, organic light-emitting display (OLED) technology, organic electroluminescence (OEL) technology, or another type of display technology. In some cases, the display 1012 is positioned beneath and viewable through a cover that forms at least a portion of an enclosure of the electronic device 1000.

In various embodiments, the input devices 1006 may include any suitable components for detecting inputs. Examples of input devices 1006 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 1006 may be configured to detect one or more particular types of input and provide a signal (e.g., an input signal) corresponding to the detected input. The signal may be provided, for example, to the processing unit 1002.

As discussed above, in some cases, the input device(s) 1006 include a touch sensor (e.g., a capacitive touch sensor) integrated with the display 1012 to provide a touch-sensitive display. Similarly, in some cases, the input device(s) 1006 include a force sensor (e.g., a capacitive force sensor) integrated with the display 1012 to provide a force-sensitive display.

The output devices 1010 may include any suitable components for providing outputs. Examples of output devices 1010 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 1010 may be configured to receive one or more signals (e.g., an output signal provided by the processing unit 1002) and provide an output corresponding to the signal.

In some cases, input devices 1006 and output devices 1010 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 1002 may be operably coupled to the input devices 1006 and the output devices 1010. The processing unit 1002 may be adapted to exchange signals with the input devices 1006 and the output devices 1010. For example, the processing unit 1002 may receive an input signal from an input device 1006 that corresponds to an input detected by the input device 1006. The processing unit 1002 may interpret the received input signal to determine whether to provide and/or change one or more outputs in response to the input signal. The processing unit 1002 may then send an output signal to one or more of the output devices 1010, to provide and/or change outputs as appropriate.

Unless otherwise stated, the terms "include" and "comprise" (and variations thereof such as "including", "includes", "comprising", "comprises", "comprised" and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

What is claimed is:

1. A method comprising, in a collaborative document system comprising a plurality of user-generated documents, each user-generated document associated with a workspace of a plurality of workspaces of the collaborative document system:
    receiving, from a client application operating on a client device, a document creation request associated with an active workspace of the plurality of workspaces of the collaborative document system;
    responsive to receiving the document creation request:
        obtaining, for the active workspace, a respective document-creation history for each of a plurality of document templates, each document template including respective template document content, wherein each respective document-creation history corresponds to a number of times a respective document template has been used to create a new document in the active workspace;
        determining, using the respective document-creation histories, whether a usage attribute for the plurality of document templates satisfies a usage condition, the usage condition being satisfied if an amount of documents created in the workspace is greater than a threshold amount;
        in response to the usage attribute satisfying the usage condition, computing, based at least in part on the respective document-creation histories, a respective relevance weight for each of the plurality of document templates associated with the active workspace;
        causing identifiers of at least a subset of the plurality of document templates to be displayed to a user in accordance with a rank order, the rank order based at least in part on the computed relevance weights for the plurality of document templates;
        detecting a user selection of an identifier of the displayed identifiers; and
        in response to detecting the user selection of the identifier, causing respective template document content of a document template associated with the selected identifier to be copied into a current document displayed to the user.

2. The method of claim 1, wherein a respective relevance weight represents a number of times a respective document template has been used to create a new document within a predetermined time window.

3. The method of claim 1, wherein:
    the document creation request is a first document creation request;
    the active workspace is a first workspace;
    the document-creation histories are first document-creation histories;
    the rank order is a first rank order;
    the plurality of document templates is a first plurality of document templates; and
    the method further comprises:
        detecting, from the user, a second document creation request originating from a second workspace of the collaborative document system, the second workspace different from the first workspace; and
        responsive to detecting the second document creation request:
            obtaining, for the second workspace, a respective second document-creation history for each of a second plurality of document templates associated with the second workspace, wherein each respective second document-creation history corresponds to a number of times a respective document template has been used to create a new document in the second workspace;
            computing, based at least in part on the respective second document-creation histories, a respective relevance weight for each of the second plurality of document templates associated with the second workspace; and
            causing identifiers of at least a subset of the second plurality of document templates to be displayed to the user in accordance with a second rank order, the second rank order based at least in part on the computed relevance weights for the second plurality of document templates.

4. The method of claim 3, wherein:
    the first plurality of document templates comprises:
        a first group of document templates that are available in two or more workspaces of the plurality of workspaces; and
        a second group of document templates that are available only in the first workspace; and
    the second plurality of document templates comprises:
        the first group of document templates; and
        a third group of documents that are available only in the second workspace.

5. The method of claim 1, wherein:
    the subset of the plurality of document templates is a first subset of the plurality of document templates; and
    the method further comprises causing identifiers of a second subset of the plurality of document templates to be displayed to the user in alphabetical order and below the first subset of the plurality of document templates.

6. A method comprising, in a collaborative document system comprising a plurality of user-generated documents, the user-generated documents associated with workspaces of the collaborative document system:
    determining, for a first workspace of the collaborative document system, respective document-creation histories for each of a first plurality of document templates associated with the first workspace, each document template of the first plurality of document templates including respective first template document content;

determining, for a second workspace of the collaborative document system, respective document-creation histories for each of a second plurality of document templates associated with the second workspace, the second plurality of document templates different from the first plurality of document templates and each document template of the second plurality of document templates including respective second template document content;

detecting, from a user, a first document creation request originating from the first workspace;

determining, using the respective document-creation histories, whether a usage attribute for the first plurality of document templates satisfies a usage condition, the usage condition being satisfied if an amount of documents created in the first workspace is greater than a threshold amount;

responsive to detecting the first document creation request and in response to the usage attribute satisfying the usage condition, causing identifiers of at least a subset of the first plurality of document templates to be displayed to the user in accordance with a first rank order, the first rank order based at least in part on the respective document-creation histories for the first plurality of document templates;

detecting a user selection of an identifier of at least a subset of the first plurality of document templates;

in response to detecting the user selection of the identifier, causing respective template document content of a document template associated with the selected identifier to be copied into a current document displayed to the user;

detecting, from the user, a second document creation request originating from the second workspace; and responsive to detecting the second document creation request, causing identifiers of at least a subset of the second plurality of document templates to be displayed to the user in accordance with a second rank order, the second rank order based at least in part on the respective document-creation histories for the second plurality of document templates.

7. The method of claim 6, wherein the collaborative document system comprises a plurality of workspaces, each workspace associated with a different set of user-generated documents organized in a different organizational hierarchy.

8. The method of claim 6, further comprising:
receiving, from the user, a definition for a first user-generated document template for use in the first workspace; and
including the first user-generated document template in the first plurality of document templates and not in the second plurality of document templates.

9. The method of claim 8, further comprising:
receiving, from the user, a definition for a second user-generated document template for use in the second workspace; and
including the second user-generated document template in the second plurality of document templates and not in the first plurality of document templates.

10. A method comprising, at a client device of a collaborative document system, the collaborative document system comprising a plurality of user-generated documents associated with workspaces of the collaborative document system:
displaying a graphical user interface on a display;
displaying, in a first region of the graphical user interface, a plurality of workspace identifiers, each respective workspace identifier corresponding to a respective workspace that is associated with a respective set of user-generated documents;
receiving a selection of a workspace identifier from the plurality of workspace identifiers, the workspace identifier associated with a workspace within the collaborative document system;
in response to receiving the selection of the workspace identifier, displaying, in the first region, a plurality of document links, each respective document link corresponding to a respective user-generated document associated with the workspace;
detecting, from a user, a document creation request originating from the workspace;
responsive to detecting the document creation request:
obtaining, for the workspace, respective document-creation histories for each of a plurality of document templates associated with the workspace, wherein each respective document-creation history corresponds to a number of times a respective document template has been used to create a new document in the workspace;
determining, using the respective document-creation histories, whether a usage attribute for the plurality of document templates satisfies a usage condition, the usage condition being satisfied if an amount of documents created in the workspace is greater than a threshold amount;
in response to the usage attribute satisfying the usage condition, displaying, in a second region of the graphical user interface, identifiers of at least a subset of the plurality of document templates in accordance with a rank order, the rank order based at least in part on the respective document-creation histories for the plurality of document templates;
detecting a user selection of an identifier of the displayed identifiers; and
in response to detecting the user selection of the identifier, causing a document template associated with the selected identifier to be displayed in a third region of the graphical user interface.

11. The method of claim 10, further comprising:
receiving user-generated content in the document template;
receiving a document generation request; and
in response to receiving the document generation request:
incorporating the user-generated content into a document based on the document template; and
storing the document in association with the selected workspace.

12. The method of claim 11, wherein:
the document template comprises a plurality of predefined text input fields; and
the user-generated content includes text input into the predefined text input fields.

13. The method of claim 10, wherein the rank order is further based on an amount of unique users who have generated documents using each of the plurality of document templates.

14. The method of claim 10, further comprising:
determining an average usage metric of the plurality of document templates;
determining a usage metric of a particular document template of the plurality of document templates; and
in accordance with a determination that a difference between the usage metric of the particular document template and the average usage metric of the plurality of document templates satisfies a criteria, including the particular document template in the subset of the plurality of document templates.

15. The method of claim 14, wherein:
the usage metric is a usage frequency; and
the criteria includes a statistical significance condition.

16. A method comprising, in a collaborative document system comprising a plurality of user-generated documents, the user-generated documents associated with workspaces of the collaborative document system:
   detecting, from a user, a document creation request originating from a workspace of the collaborative document system;
   responsive to detecting the document creation request:
      obtaining, for the workspace, respective document-creation histories for each of a plurality of document templates associated with the workspace, wherein each respective document-creation history corresponds to a number of times a respective document template has been used to create a new document in the workspace;
      determining, using the respective document-creation histories, whether a usage attribute of the plurality of document templates satisfies a usage condition, the usage attribute satisfies the usage condition if an amount of documents in the workspace is greater than a threshold amount;
      responsive to the usage attribute failing to satisfy the usage condition, causing a first set of identifiers corresponding to a first subset of the plurality of document templates to be displayed the user; and
      responsive to the usage attribute satisfying the usage condition, causing a second set of identifiers corresponding to a second subset of the plurality of document templates to be displayed the user, the second subset different from the first subset.

17. The method of claim 16, wherein the usage attribute satisfies the usage condition if:
   an amount of documents in the workspace is greater than a first threshold amount; and
   an amount of unique users who have generated documents in the workspace is greater than a second threshold amount.

18. A method comprising, in a collaborative document system comprising a plurality of user-generated documents, the user-generated documents associated with workspaces of the collaborative document system:
   detecting, from a user, a first document creation request originating from a workspace of the collaborative document system;
   responsive to detecting the first document creation request:
      identifying a first plurality of document templates associated with the workspace, wherein the first plurality of document templates only includes document templates that are shared among multiple workspaces of the collaborative document system; and
      causing identifiers of at least a subset of the first plurality of document templates to be displayed to the user;
   after detecting the first document creation request, detecting, from the user, a second document creation request originating from the workspace of the collaborative document system;
   responsive to detecting the second document creation request:
      identifying a second plurality of document templates associated with the workspace, the second plurality of document templates comprising:
         the first plurality of document templates; and
         a local document template that is accessible only within the workspace of the collaborative document system, each of the local document template and the first plurality of document templates including respective template document content;
      determining, using a group of document-creation events with respect to the workspace, whether a usage attribute satisfies a usage condition, the usage condition being satisfied in response to an amount of documents being created in the workspace being greater than a threshold amount; and
      responsive to the usage attribute satisfying the usage condition, causing identifiers of at least a subset of the second plurality of document templates to be displayed to the user;
   detecting a user selection of an identifier of the at least the subset of the second plurality of document templates; and
   in response to detecting the user selection of the identifier, causing respective template document content of a document template associated with the selected identifier to be copied into a current document displayed to the user.

19. The method of claim 18, wherein the local document template was added to the collaborative document system after the first document creation request was detected.

* * * * *